(12) United States Patent
Umetsu et al.

(10) Patent No.: US 11,923,541 B2
(45) Date of Patent: Mar. 5, 2024

(54) LITHIUM ION SECONDARY BATTERY

(71) Applicant: Asahi Kasei Kabushiki Kaisha, Tokyo (JP)

(72) Inventors: Kazuteru Umetsu, Tokyo (JP); Nobuhiro Okada, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 369 days.

(21) Appl. No.: 16/644,676

(22) PCT Filed: Jul. 16, 2019

(86) PCT No.: PCT/JP2019/027978
§ 371 (c)(1),
(2) Date: Mar. 5, 2020

(87) PCT Pub. No.: WO2020/017515
PCT Pub. Date: Jan. 23, 2020

(65) Prior Publication Data
US 2020/0287234 A1 Sep. 10, 2020

(30) Foreign Application Priority Data

Jul. 18, 2018 (JP) .................................. 2018-134785
Dec. 19, 2018 (JP) .................................. 2018-237525

(51) Int. Cl.
*H01M 4/525* (2010.01)
*H01M 4/36* (2006.01)
*H01M 4/505* (2010.01)
*H01M 4/587* (2010.01)
*H01M 10/0525* (2010.01)
*H01M 10/0569* (2010.01)

(52) U.S. Cl.
CPC ........... *H01M 4/525* (2013.01); *H01M 4/364* (2013.01); *H01M 4/505* (2013.01); *H01M 4/587* (2013.01); *H01M 10/0525* (2013.01); *H01M 10/0569* (2013.01); *H01M 2300/0028* (2013.01)

(58) Field of Classification Search
None
See application file for complete search history.

(56) References Cited

U.S. PATENT DOCUMENTS

| 6,300,013 | B1 * | 10/2001 | Yamada | ................ | H01M 4/583 |
| | | | | | 429/231.95 |
| 2006/0134521 | A1 | 6/2006 | Shima | | |
| 2008/0102369 | A1 * | 5/2008 | Sakata | ............. | H01M 10/4235 |
| | | | | | 429/188 |
| 2016/0036038 | A1 | 2/2016 | Kuriyama et al. | | |
| 2016/0087311 | A1 * | 3/2016 | Doelle | ............. | H01M 10/0568 |
| | | | | | 429/188 |
| 2016/0293952 | A1 | 10/2016 | Kaneda et al. | | |

| 2017/0229704 | A1 * | 8/2017 | Takahashi | ......... | H01M 10/0585 |
| 2017/0358799 | A1 | 12/2017 | Gunji et al. | | |
| 2018/0269486 | A1 | 9/2018 | Umetsu et al. | | |
| 2018/0277900 | A1 | 9/2018 | Abe et al. | | |
| 2019/0020034 | A1 | 1/2019 | Umetsu et al. | | |

FOREIGN PATENT DOCUMENTS

| CN | 105765770 A | 7/2016 | | |
| CN | 107112531 A | 8/2017 | | |
| JP | H05-343066 A | 12/1993 | | |
| JP | 2003-338281 A | 11/2003 | | |
| JP | 2004-339032 A1 * | 12/2004 | ............ | Y02E 60/10 |
| JP | 2008-270199 A | 11/2008 | | |
| JP | 2016-035899 A | 3/2016 | | |
| JP | 2016-038962 A | 3/2016 | | |
| JP | 2018-029073 A | 2/2018 | | |
| JP | 2018-056021 A | 4/2018 | | |
| JP | 2018-056425 A | 4/2018 | | |
| JP | 2018-056443 A | 4/2018 | | |
| JP | 2018-061039 A | 4/2018 | | |
| KR | 10-2016-0020982 A | 2/2016 | | |
| WO | 2013/038672 A1 | 3/2013 | | |

(Continued)

OTHER PUBLICATIONS

International Search Report issued in corresponding International Patent Application No. PCT/JP2019/027978 dated Oct. 8, 2019.

(Continued)

*Primary Examiner* — Jonathan G Leong
*Assistant Examiner* — Tony S Chuo
(74) *Attorney, Agent, or Firm* — Morgan, Lewis & Bockius LLP

(57) ABSTRACT

A lithium ion secondary cell comprising a positive electrode, a negative electrode, and a non-aqueous electrolyte that contains lithium ions, the lithium ion secondary cell being such that: the positive electrode has a positive electrode current collector and a positive electrode active material layer; the positive electrode active material layer contains a positive electrode active material and a lithium compound; the positive electrode active material includes a transition metal oxide; the concentration of the lithium compound, which is the portion other than the positive electrode active material in the positive electrode active material layer, is 0.1-10 mass %; the negative electrode has a negative electrode current collector and a negative electrode active material layer; the negative electrode active material layer contains 50-95 mass % of a carbon material and 5-50 mass % of an alloy-based active material.

13 Claims, No Drawings

(56) References Cited

FOREIGN PATENT DOCUMENTS

WO     2017/126690 A1     1/2017
WO     2017/057588 A1     4/2017
WO     2017/126682 A1     7/2017

OTHER PUBLICATIONS

Supplementary European Search Report issued in corresponding European Patent Application No. 19837687.3 dated Sep. 21, 2021.
International Preliminary Report on Patentability and Written Opinion issued in corresponding International Patent Application No. PCT/JP2019/027978 dated Jan. 28, 2021.

* cited by examiner

LITHIUM ION SECONDARY BATTERY

FIELD

The present invention relates to a lithium ion secondary battery.

BACKGROUND

Attention has recently been focused on power smoothing systems or nighttime power storage systems utilizing wind power generation, home distributed power storage systems based on solar power generation technology and power storage systems for electric vehicles from the viewpoint of effective utilization of energy with the aim of preservation of the global environment and saving resources.

The foremost requirement placed on batteries used in these power storage systems is high energy density. The development of lithium ion secondary batteries is being aggressively pursued as a promising candidate for high energy density batteries capable of responding to such needs.

The second requirement is high output characteristics. For example, power storage systems are required that demonstrate high output discharge characteristics during acceleration in combinations of highly efficient engines and power storage systems (such as hybrid electric vehicles) or combinations of fuel cells and power storage systems (such as fuel cell electric vehicles).

Research is being aggressively pursued that uses an alloy-based active material, which contains atoms such as silicon or tin that form an alloy with lithium, as a negative electrode active material in order to enhance the energy density of lithium ion secondary batteries. However, alloy-based active materials have problems with durability in the charge-discharge cycle due to large volume expansion and contraction accompanying charging and discharging of the battery. Alloy-based active materials have low initial charge/discharge efficiency, and the increase efficiency of energy density ends up decreasing even if the ratio of alloy-based active material used as a negative electrode active material is 5% or more.

With the foregoing in view, technology for pre-doping an alloy-based active material by forming a lithium metal layer on the surface of a negative electrode that uses an alloy-based active material (PTL1). However, since pre-doping proceeds the instant the lithium metal contacts the negative electrode, there is the problem of deterioration of the negative electrode due to volume expansion of the alloy-based active material and the effect of heat attributable to pre-doping.

PLT2 proposes a technology for improving durability at high temperatures by enabling pre-doping to be carried out under mild conditions using a lithium compound such as lithium carbonate and forming a lithium ion-permeable coating on a positive electrode active material layer. However, this technology has the problems of deterioration of the positive electrode active material due to a reaction with the lithium carbonate during pre-doping as well as separation of the positive electrode active material layer caused by generated $CO_2$ gas resulting in micro-short circuits.

A lithium ion secondary battery has been proposed that can be used over a broad temperature range of, for example, −40° C. to 100° C. and demonstrates superior output characteristics and temperature durability by using an electrolyte having high electrical conductivity in order to enhance the output characteristics of lithium ion secondary batteries (PTL3). A lithium ion secondary battery has been proposed that enhances peel strength between the positive electrode active material layer and positive electrode current collector (PTL4). A nonaqueous lithium storage element has been proposed that demonstrates superior self-discharge characteristics and output characteristics by containing Na and/or K atoms in the positive electrode active material layer (PTL5). However, none of these technologies take into consideration increasing energy density by pre-doping an alloy-based active material or any of the above-mentioned problems accompanying pre-doping.

CITATION LIST

Patent Literature

PTL1: International Publication No. WO 2013/038672
PTL2: International Publication No. WO 2017/126682
PTL3: International Publication No. WO 2017/057588
PTL4: Japanese Unexamined Patent Publication No. 2016-38962
PTL5: International Publication No. WO 2017/126690

SUMMARY

Technical Problem

The present invention was completed with the foregoing in view. Thus, an object of the present is to provide a lithium ion secondary battery that enhances charge/discharge efficiency of an alloy-based active material, demonstrates high capacity and high output, inhibits deterioration of the positive electrode active material during pre-doping, has a low micro-short circuit rate, and demonstrates superior cycle characteristics.

Solution to Problem

The inventors of the present invention conducted extensive studies and repeated experiments to solve the above-mentioned problems.

As a result, the inventors of the present invention found that the above-mentioned problems can be solved by a lithium ion secondary battery, which:
  contains a positive electrode active material and a lithium compound other than the positive electrode active material in a positive electrode active material layer; wherein,
  the positive electrode active material contains a transition metal oxide that is capable of occluding and releasing lithium ions and contains Ni atoms, and
  a positive electrode is used in which the difference between Ni3p main peak energy and sub-peak energy of the positive electrode active material layer as measured by X-ray photoelectron spectroscopy (XPS) has been adjusted to within a specific range.

The present invention was completed on the basis of these findings. Namely, the present invention is as indicated below.
  <<Aspect 1>>
  A lithium ion secondary battery provided with a positive electrode, a negative electrode and a nonaqueous electrolyte containing lithium ions; wherein,
    the positive electrode has a positive electrode current collector and a positive electrode active material layer provided on one side or both sides of the positive electrode current collector, the positive electrode active material layer contains a positive electrode active material and a lithium compound other than the positive electrode active material, the positive electrode active material contains a transition metal oxide that is capable of occluding and releasing lithium ions and contains Ni atoms, the concentration of the lithium compound other than the positive electrode active material contained in the positive electrode active material layer based on the total weight of the positive electrode active material layer is 0.1 wt % to 10 wt %, the negative electrode has a negative electrode current collector and a negative electrode active material layer provided on one side or both sides of the negative electrode current collector, the negative electrode active material layer, based on the total weight of the negative electrode active material layer, contains a carbon material as a first negative electrode active material at a ratio of 50 wt % to 95 wt %, contains at least one type among silicon, silicon compounds, tin and tin compounds as a second negative electrode active material at a ratio of 5 wt % to 50 wt %, and the difference between energy of the Ni3p main peak and energy of the Ni3p sub-peak as measured by X-ray photoelectron spectroscopy (XPS) of the positive electrode active material layer when the voltage of the lithium ion secondary battery is 3.5 V, is 4.9 eV to 6.1 eV.

<<Aspect 2>>

The lithium ion secondary battery described in Aspect 1, wherein the first negative electrode active material contained in the negative electrode active material layer is graphite, and the concentration of the graphite contained in the negative electrode active material layer based on the total weight of the negative electrode active material layer is 55 wt % to 95 wt %.

<<Aspect 3>>

The lithium ion secondary battery described in Aspect 1 or Aspect 2, wherein the relative concentration of F atoms, as measured by X-ray photoelectron spectroscopy (XPS) of the positive electrode active material layer when the voltage of the lithium ion secondary battery is 3.5 V, is 7.2 atomic % to 27.1 atomic %.

<<Aspect 4>>

The lithium ion secondary battery described in any of Aspects 1 to 3, wherein the relative concentration of F atoms, as measured by X-ray photoelectron spectroscopy (XPS) of the negative electrode active material layer when the voltage of the lithium ion secondary battery is 3.5 V, is 7.5 atomic % to 46.5 atomic %.

<<Aspect 5>>

The lithium ion secondary battery described in any of Aspects 1 to 4, wherein the positive electrode active material layer further contains at least one type of alkaline metal atoms selected from the group consisting of Na atoms and K atoms, and the concentration of alkaline metal atoms contained in the positive electrode active material layer based on the total weight of the positive electrode active material layer is 1 ppm to 500 ppm.

<<Aspect 6>>

The lithium ion secondary battery described in any of Aspects 1 to 5, wherein the peel strength between the positive electrode active material layer and the positive electrode current collector is 0.01 N/cm to 2.00 N/cm, and the nonaqueous electrolyte contains $LiPO_2F_2$ at a ratio of 0.001 wt % to 5.000 wt %.

<<Aspect 7>>

The lithium ion secondary battery described in any of Aspects 1 to 6, wherein the transition metal oxide contains at least one type of compound selected from the group consisting of compounds respectively represented by the following formulas:

$$Li_xNi_aCo_bAl_{(1-a-b)}O_2$$

(wherein, x satisfies 0≤x≤1, a satisfies 0.05<a<0.97, and b satisfies 0.05<b<0.97), and $$Li_xNi_cCo_dMn_{(1-c-d)}O_2$$

(wherein, x satisfies 0≤x≤1, c satisfies 0.05<c<0.97, and d satisfies 0.05<d<0.97).

<<Aspect 8>>

The lithium ion secondary battery described in any of Aspects 1 to 7, wherein the positive electrode active material layer contains at least one type of compound selected from the group consisting of compounds respectively represented by the following formulas (1) to (3) at a ratio of $3.8 \times 10^{-9}$ mol/g to $3.0 \times 10^{-2}$ mol/g per unit weight of the positive electrode active material layer:

$$LiX^1—OR^1O—X^2Li \qquad (1)$$

(wherein, $R^1$ represents an alkylene group having 1 to 4 carbon atoms or a halogenated alkylene group having 1 to 4 carbon atoms, and $X^1$ and $X^2$ respectively and independently represent a single bond or —(COO)—), $$LiX^1—OR^1O—X^2R^2 \qquad (2)$$

(wherein, $R^1$ represents an alkylene group having 1 to 4 carbon atoms or halogenated alkylene group having 1 to 4 carbon atoms, $R^2$ represents hydrogen, an alkyl group having 1 to 10 carbon atoms, a monohydroxyalkyl group having 1 to 10 carbon atoms, a polyhydroxyalkyl group having 1 to 10 carbon atoms, an alkenyl group having 2 to 10 carbon atoms, a monohydroxyalkenyl group having 2 to 10 carbon atoms, a polyhydroxyalkenyl group having 2 to 10 carbon atoms, a cycloalkyl group having 3 to 6 carbon atoms or an aryl group, and $X^1$ and $X^2$ respectively and independently represent a single bond or —(COO)—), and $$R^2X^1—OR^1O—X^2R^3 \qquad (3)$$

(wherein, $R^1$ represents an alkylene group having 1 to 4 carbon atoms or a halogenated alkylene group having 1 to 4 carbon atoms, $R^2$ and $R^3$ respectively and independently represent hydrogen, an alkyl group having 1 to 10 carbon atoms, a monohydroxyalkyl group having 1 to 10 carbon atoms, a polyhydroxyalkyl group having 1 to 10 carbon atoms, an alkenyl group having 2 to 10 carbon atoms, a monohydroxyalkenyl group having 2 to 10 carbon atoms, a polyhydroxyalkenyl group having 2 to 10 carbon atoms, a cycloalkyl group having 3 to 6 carbon atoms or an aryl group, and $X^1$ and $X^2$ respectively and independently represent a single bond or —(COO)—).

<<Aspect 9>>

The lithium ion secondary battery described in any of Aspects 1 to 8, wherein the lithium compound other than the positive electrode active material is lithium carbonate.

<<Aspect 10>>

The lithium ion secondary battery described in any of Aspects 1 to 9, wherein the concentration of water contained in the nonaqueous electrolyte is 1 ppm to 5,000 ppm.

<<Aspect 11>>

The lithium ion secondary battery described in any of Aspects 1 to 10, containing one or more types of lithium salts selected from $LiPF_6$, $LiBF_4$, $LiN(SO_2F)_2$, $LiN(SO_2F)(SO_2CF_3)$, $LiN(SO_2CF_3)_2$ and $LiClO_4$ in the nonaqueous electrolyte.

<<Aspect 12>>

The lithium ion secondary battery described in any of Aspects 1 to 11, containing one or more types of organic solvents selected from dimethyl carbonate, ethyl methyl carbonate and diethyl carbonate in the nonaqueous electrolyte.

<<Aspect 13>>

The lithium ion secondary battery described in any of Aspects 1 to 12, wherein the negative electrode potential at a voltage of 2.5 V is 0.3 V to 1.2 V.

<<Aspect 14>>

The lithium ion secondary battery described in any of Aspects 1 to 13, wherein volumetric energy density is 500 Wh/L to 1,500 Wh/L.

<<Aspect 15>>

The lithium ion secondary battery described in any of Aspects 1 to 14, wherein the relative concentration of Li atoms having a peak at 52.5 eV to 53.7 eV in the Li1s spectrum observed by X-ray photoelectron spectroscopy (XPS) of the negative electrode active material layer when the voltage of the lithium ion secondary battery is 3.5 V, is 1.0 atomic % to 25.0 atomic %.

<<Aspect 16>>

A power storage module, power regeneration system, power load leveling system, uninterruptable power supply system, non-contact power supply system, energy harvesting system, natural energy storage system, electric power steering system, emergency power supply system, in-wheel motor system, idle reduction system, electric vehicle, plug-in hybrid vehicle, electric motorcycle, quick charge system, cell phone, smartphone, personal computer or power storage system using the lithium ion secondary battery described in any of Aspects 1 to 15.

<<Aspect 17>>

An electrode body provided with a positive electrode precursor and a negative electrode; wherein,
the positive electrode precursor has a positive electrode current collector and a positive electrode active material layer provided on one side or both sides of the positive electrode current collector,
the positive electrode active material layer contains a positive electrode active material and a lithium compound other than the positive electrode active material,
the positive electrode active material contains a transition metal oxide that is capable of occluding and releasing lithium ions and contains Ni atoms,
the concentration of the lithium compound other than the positive electrode active material contained in the positive electrode active material layer is 1 wt % to 15 wt %,
the negative electrode has a negative electrode current collector and a negative electrode active material layer provided on one side or both sides of the negative electrode current collector, and
the negative electrode active material layer, based on the total weight of the negative electrode active material layer,
contains a carbon material as a first negative electrode active material at a ratio of 50 wt % to 95 wt %, and
contains at least one type among silicon, silicon compounds, tin and tin compounds as a second negative electrode active material at a ratio of 5 wt % to 50 wt %.

<<Aspect 18>>

The electrode body described in Aspect 17, wherein the first negative electrode active material contained in the negative electrode active material layer is graphite, and
the concentration of the graphite contained in the negative electrode active material layer based on the total weight of the negative electrode active material layer is 55 wt % to 95 wt %.

<<Aspect 19>>

The electrode body described in Aspect 17 or 18, wherein the positive electrode active material layer further contains at least one type of alkaline metal atoms selected from the group consisting of Na atoms and K atoms, and
the concentration of alkaline metal atoms contained in the positive electrode active material layer based on the total weight of the positive electrode active material layer is 1 ppm to 500 ppm.

<<Aspect 20>>

The electrode body described in any of Aspects 17 to 19, wherein the peel strength between the positive electrode active material layer and the positive electrode current collector is 0.01 N/cm to 2.00 N/cm.

<<Aspect 21>>

The electrode body described in any of Aspects 17 to 20, wherein the lithium compound other than the positive electrode active material is lithium carbonate.

<<Aspect 22>>

The electrode body described in any of Aspects 17 to 21, wherein,
when the area ratio of carbonate ion mapping in an image obtained by micro Raman spectroscopy of the surface of the positive electrode precursor is defined as A (%), and
the concentration of the lithium compound other than the positive electrode active material contained in the positive electrode active material layer is defined as Y (wt %), then
A is 1% to 30% and $0.5 \leq A/Y \leq 2.0$.

<<Aspect 23>>

A method for producing a lithium ion secondary battery by applying a voltage of 4.2 V or higher to the electrode body described in any of Aspects 17 to 22 in a temperature environment at 20° C. to 60° C., and decomposing a lithium compound other than the positive electrode active material to carry out pre-doping.

<<Aspect 24>>

A method for producing a lithium ion secondary battery by carrying out constant current charging on the electrode body described in any of Aspects 17 to 22, and carrying out constant voltage charging after having reached a set voltage of 4.2 V or higher to decompose a lithium compound other than the positive electrode active material layer; wherein,
pre-doping is judged to have been completed when the current value during constant voltage charging has become 0.3 times or less that during constant current charging.

Advantageous Effects of Invention

According to the present invention, a lithium ion secondary battery can be provided that enhances charge/discharge efficiency of an alloy-based active material, demonstrates high capacity and high output, inhibits deterioration of the positive electrode active material during pre-doping, has a low micro-short circuit rate, and demonstrates superior cycle characteristics.

DESCRIPTION OF EMBODIMENTS

Although the following provides a detailed explanation of an embodiment of the present invention (referred to as the "present embodiment"), the present invention is not limited to the present embodiment. Upper limit values and lower limit values in each of the numerical ranges of the present embodiment can compose an arbitrary numerical range by an arbitrary combination thereof.

In the present description, a "lithium ion secondary battery" has a positive electrode, a negative electrode, a separator and an electrolyte as main constituents thereof.

<<Positive Electrode and Positive Electrode Precursor>>

The positive electrode in the present embodiment has a positive electrode current collector and a positive electrode active material layer provided on one side or both sides thereof.

The positive electrode in the present embodiment preferably contains a lithium compound when in the form of a positive electrode precursor prior to assembly of a storage element. As will be subsequently described, the negative electrode is preferably pre-doped with lithium ions during assembly of a power storage element in the present embodiment. The pre-doping method in the present embodiment preferably consists of assembling a power storage element using a positive electrode precursor containing a lithium compound, a negative electrode, a separator and a nonaqueous electrolyte, followed by applying a voltage between the positive electrode precursor and negative electrode. The lithium compound may be contained in any state in the positive electrode precursor and positive electrode. For example, the lithium compound may be present between the positive electrode current collector and the positive electrode active material layer or may be present on the surface of the positive electrode active material layer. However, the lithium compound is preferably contained in the positive electrode active material layer formed on the positive electrode current collector of a positive electrode precursor.

In the present embodiment, the state of a positive electrode prior to the pre-doping to be subsequently described is defined as a "positive electrode precursor", while the state of a positive electrode after pre-doping is defined as a "positive electrode".

The following provides an explanation of the lithium ion secondary battery of the present embodiment while focusing on preferable examples of each constituent containing the "positive electrode" after pre-doping, after which an explanation is provided of a method for producing a lithium ion secondary battery using the "positive electrode precursor" prior to pre-doping.

<<Lithium Ion Secondary Battery>>

The lithium ion secondary battery of the present embodiment is provided with a positive electrode, a negative electrode and a nonaqueous electrolyte containing lithium ions.

<Positive Electrode>

The positive electrode has a positive electrode current collector and a positive electrode active material layer provided on one side or both sides of the positive electrode current collector.

The positive electrode active material layer at least contains a positive electrode active material and a lithium compound other than the positive electrode active material.

The positive electrode active material contains a transition metal oxide that is capable of occluding and releasing lithium ions and contains Ni atoms.

[Positive Electrode Current Collector]

Although there are no particular limitations on the material that composes the positive electrode current collector in the present embodiment provided it has high electron conductivity and is resistant to elution into the electrolyte and deterioration caused by a reaction between the electrolyte and ions, a metal foil is preferable. Aluminum foil is particularly preferable as a positive electrode current collector for the lithium ion secondary battery of the present embodiment.

The metal foil may be a metal foil in the form of a flat film free of surface irregularities and through holes, may be a metal foil having surface irregularities obtained by embossing, chemical etching, electrolytic deposition or blasting, or may be a metal foil having through holes such as expanded metal, perforated metal or etched foil.

There are no particular limitations on the thickness of the positive electrode current collector provided the shape and strength of the positive electrode can be adequately retained, and is, for example, 1-100 μm.

[Positive Electrode Active Material Layer]

The positive electrode active material layer at least contains a positive electrode active material and a lithium compound other than the positive electrode active material, and in addition thereto, may contain at least one type of optional component, such as alkaline metal atoms selected from the group consisting of Na atoms and K atoms, a lithium compound other than the positive electrode active material, a conductive filler, a binder or dispersion stabilizer, as necessary.

(Positive Electrode Active Material)
—Transition Metal Oxide—

The positive electrode active material contains a transition metal oxide that is capable of occluding and releasing lithium ions and contains Ni atoms. There are no particular limitations on the transition metal oxide used as a positive electrode active material. Examples of transition metal oxides include oxide containing lithium (Li) atoms and nickel (Ni) atoms. In addition to Li atoms and Ni atoms, the transition metal oxide may further contain at least one type of atom selected from the group consisting of cobalt (Co), magnesium (Mg), manganese (Mn), aluminum (Al), iron (Fe), titanium (Ti), vanadium (V) and chromium (Cr).

The use of a transition metal oxide that is capable of occluding and releasing lithium ions and contains Ni atoms for the positive electrode active material allows the obtaining of the advantage of increasing energy density of the lithium ion secondary battery.

Specific examples of these transition metal oxides include $Li_xNiO_2$, $Li_xNi_yM_{(1-y)}O_2$ (wherein, M represents at least one type of atom selected from the group consisting of Co, Mn, Al, Fe, Mg and Ti, and y satisfies $0.05<y<0.97$), $Li_xNi_{1/3}Co_{1/3}Mn_{1/3}O_2$, $Li_xMnO_2$, $\alpha$-$LixFeO_2$, $Li_xNi_aCo_bAl_{(1-a-b)}O_2$ (wherein, a and b respectively and independently satisfy $0.05<a<0.97$ and $0.05<b<0.97$), and $Li_xNi_cCo_dMn_{(1-c-d)}O_2$ (wherein, c and d respectively and independently satisfy $0.05<c<0.97$ and $0.05<d<0.97$) (x satisfies $0\leq x\leq 1$ in the above formulas). Among these, at least one type of transition metal oxide selected from the group consisting of compounds respectively represented by the following formulas:

$$Li_xNi_aCo_bAl_{(1-a-b)}O_2$$

(wherein, x satisfies 0≤x≤1, a satisfies 0.05<a<0.97 and b satisfies 0.05<b<0.97), and

(wherein, x satisfies 0≤x≤1, c satisfies 0.05<c<0.97 and d satisfies 0.05<d<0.97) is used particularly preferably.

The positive electrode active material may further optionally contain a transition metal oxide that is capable of occluding and releasing lithium ions but does not contain Ni atoms.

Examples of these transition metal oxides include $Li_xCoO_2$, $\alpha\text{-}Li_xFeO_2$, $Li_xVO_2$, $Li_xCrO_2$, $Li_xFePO_4$, $Li_xMn_2O_4$, $Li_xM_yMn_{(2-y)}O_4$ (wherein, M represents at least one type of atom selected from the group consisting of Co, Mn, Al, Fe, Mg and Ti and y satisfies 0.05<y<0.97) (x satisfies 0≤x≤1 in the above formulas), and $Li_2MnO_3$-$LiMO_2$ (wherein, M represents at least one type of atom selected from the group consisting of Co, Mn, Al, Fe, Mg and Ti).

The ratio of the transition metal oxide that is capable of occluding and releasing lithium ions and contains Ni atoms contained in the transition metal oxide as a positive electrode active material based on the total weight of transition metal oxide present in the positive electrode active material is preferably 50 wt % or more, more preferably 70 wt % or more, even more preferably 90 wt % or more and particularly preferably 95 wt % or more, and may also be 100 wt %.

—Other Positive Electrode Active Material—

Only a transition metal oxide may be used as a positive electrode active material in the present embodiment or another positive electrode active material may be used in combination with the transition metal oxide.

An example of another positive electrode active material is activated carbon.

There are no particular limitations on the activated carbon and commercially available products obtained from various types of raw materials such as petroleum-based, coal-based, vegetable-based or polymer-based raw materials can be used. The content ratio of activated carbon based on the total weight of the positive electrode active material layer in the positive electrode precursor is preferably 15 wt % or less and more preferably 10 wt % or less. In the case the content ratio is 15 wt % or less, energy density of the lithium ion secondary battery can be increased.

—Mean Particle Diameter of Positive Electrode Active Material—

The mean particle diameter of the positive electrode active material is preferably 1-20 μm. If the mean particle diameter of the positive electrode active material is 1 μm or more, the capacity per electrode volume tends to increase due to the high density of the active material layer. Although durability may decrease if the mean particle diameter of the positive electrode active material is small, durability is unlikely to decrease if the mean particle diameter is 1 μm or more. If the mean particle diameter of the positive electrode active material is 20 μm or less, it tends to be easier to accommodate high-speed charging and discharging. The mean particle diameter of the positive electrode active material is more preferably 1-15 μm and even more preferably 1-10 μm.

The mean particle diameter of an active material in the present embodiment refers to particle diameter at the point a cumulative curve reaches 50% (namely, 50% diameter (median diameter)) when that cumulative curve is determined based on a value of 100% for total volume and particle size distribution is measured using a particle size distribution analyzer. This mean particle diameter can be measured using a commercially available laser diffraction particle size distribution analyzer.

—Content Ratio of Positive Electrode Active Material—

The content ratio of the positive electrode active material in the positive electrode active material layer based on the total weight of the positive electrode active material layer is preferably 35 wt % to 95 wt %. The lower limit of the content ratio of the positive electrode active material is more preferably 45 wt % or more and even more preferably 55 wt % or more. The upper limit of the content ratio of the positive electrode active material is more preferably 93 wt % or less. Preferable charge/discharge characteristics are demonstrated as a result of the content ratio of the positive electrode active material in the positive electrode active material layer being 35 wt % to 95 wt %.

(Alkaline Metal Atoms)

The positive electrode active material layer in the positive electrode of the present embodiment may contain at least one type of alkaline metal atoms selected from the group consisting of Na atoms and K atoms. The alkaline metal atoms contained in the positive electrode active material layer of the positive electrode precursor may remain as is as alkaline metal atoms in the positive electrode active material layer of the positive electrode.

The alkaline metal atoms in the positive electrode active material layer of the positive electrode precursor will be subsequently described.

In the positive electrode of the present embodiment, the concentration of alkaline metal atoms contained in the positive electrode active material layer is 1 ppm to 500 ppm.

(Lithium Compound Other than Positive Electrode Active Material)

The lithium compound other than a positive electrode active material contained in the positive electrode active material layer of the positive electrode of the present embodiment has the functions of allowing the lithium compound contained in the positive electrode precursor for the purpose of pre-doping the negative electrode to remain following decomposition in the pre-doping step as well as adsorbing fluorine ions generated during high-load charge/discharge cycling in the resulting lithium ion secondary battery, while also being able to contribute to improved energy density.

One or more types of lithium compounds selected from lithium carbonate, lithium oxide, lithium hydroxide, lithium formate, lithium acetate, lithium fluoride, lithium chloride, lithium bromide, lithium iodide, lithium nitrate, lithium sulfate, lithium sulfite, lithium phosphate and lithium oxalate are preferably used as a lithium compound other than the positive electrode active material. Among these, lithium carbonate is used preferably.

The mean particle diameter of the lithium compound other than the positive electrode active material contained in the positive electrode active material layer of the positive electrode is preferably 0.1 μm to 10 μm and more preferably 0.5 μm to 5 μm. In the case the mean particle diameter of this lithium compound is 0.1 μm or more, characteristic deterioration and generation of gas caused by high-temperature storage can be inhibited by efficiently adsorbing fluorine ions generated as a result of high-temperature storage. In the case the mean particle diameter of the lithium compound is 10 μm or less, adsorption of fluorine can be carried out efficiently since the reaction area with fluorine ions generated during high-load charge/discharge cycling increases.

The amount of the lithium compound other than the positive electrode active material contained in the positive electrode active material layer of the positive electrode based on the total weight of the positive electrode active material layer is preferably 0.1 wt % to 10 wt %, more preferably 0.3 wt % to 8 wt %, and even more preferably 0.5 wt % to 5 wt %. If the amount of the lithium compound is 0.1 wt % or more, high-load charge/discharge cycle characteristics improve since the lithium compound remains in an amount sufficient for adsorbing fluorine ions generated during high-load charge/discharge cycling. If the amount of the lithium compound is 10 wt % or less, energy density of the lithium ion secondary battery can be increased.

It should be noted here that the recommended range of the amount of lithium compound contained in the positive electrode active material layer of the positive electrode precursor to be subsequently described is 1 wt % to 15 wt %, which is lower than this value in the positive electrode.

(Compounds of Formulas (1)-(3))

The positive electrode active material layer of the positive electrode in the present embodiment preferably contains at least one type of compound selected from the group consisting of compounds represented by the following formulas (1)-(3) at $3.8 \times 10^{-9}$ mol/g to $3.0 \times 10^{-2}$ mol/g per unit weight of the positive electrode active material layer:

(wherein, $R^1$ represents an alkylene group having 1 to 4 carbon atoms or a halogenated alkylene group having 1 to 4 carbon atoms, and $X^1$ and $X^2$ respectively and independently represent a single bond or —(COO)—),

(wherein, $R^1$ represents an alkylene group having 1 to 4 carbon atoms or halogenated alkylene group having 1 to 4 carbon atoms, $R^2$ represents hydrogen, an alkyl group having 1 to 10 carbon atoms, a monohydroxyalkyl group having 1 to 10 carbon atoms, a polyhydroxyalkyl group having 1 to 10 carbon atoms, an alkenyl group having 2 to 10 carbon atoms, a monohydroxyalkenyl group having 2 to 10 carbon atoms, a polyhydroxyalkenyl group having 2 to 10 carbon atoms, a cycloalkyl group having 3 to 6 carbon atoms or an aryl group, and $X^1$ and $X^2$ respectively and independently represent a single bond or —(COO)—), and

(wherein, $R^1$ represents an alkylene group having 1 to 4 carbon atoms or a halogenated alkylene group having 1 to 4 carbon atoms, $R^2$ and $R^3$ respectively and independently represent hydrogen, an alkyl group having 1 to 10 carbon atoms, a monohydroxyalkyl group having 1 to 10 carbon atoms, a polyhydroxyalkyl group having 1 to 10 carbon atoms, an alkenyl group having 2 to 10 carbon atoms, a monohydroxyalkenyl group having 2 to 10 carbon atoms, a polyhydroxyalkenyl group having 2 to 10 carbon atoms, a cycloalkyl group having 3 to 6 carbon atoms or an aryl group, and $X^1$ and $X^2$ respectively and independently represent a single bond or —(COO)—).

Particularly preferable examples of compounds represented by formula (1) include $LiOC_2H_4OLi$, $LiOC_3H_6OLi$, $LiOC_2H_4OCOOLi$, $LiOCOOC_3H_6OLi$, $LiOCOOC_2H_4OCOOLi$ and $LiOCOOC_3H_6OCOOLi$.

Particularly preferable examples of compounds represented by formula (2) include $LiOC_2H_4OH$, $LiOC_3H_6OH$, $LiOC_2H_4OCOOH$, $LiOC_3H_6OCOOH$, $LiOCOOC_2H_4OCOOH$, $LiOCOOC_3H_6OCOOH$, $LiOC_2H_4OCH_3$, $LiOC_3H_6OCH_3$, $LiOC_2H_4OCOOCH_3$, $LiOC_3H_6OCOOCH_3$, $LiOCOOC_2H_4OCOOCH_3$, $LiOCOOC_3H_6OCOOCH_3$, $LiOC_2H_4OC_2H_5$, $LiOC_3H_6OC_2H_5$, $LiOC_2H_4OCOOC_2H_5$, $LiOC_3H_6OCOOC_2H_5$, $LiOCOOC_2H_4OCOOC_2H_5$ and $LiOCOOC_3H_6OCOOC_2H_5$.

Particularly preferable examples of compounds represented by formula (3) include $HOC_2H_4OH$, $HOC_3H_6OH$, $HOC_2H_4OCOOH$, $HOC_3H_6OCOOH$, $HOCOOC_2H_4OCOOH$, $HOCOOC_3H_6OCOOH$, $HOC_2H_4OCH_3$, $HOC_3H_6OCH_3$, $HOC_2H_4OCOOCH_3$, $HOC_3H_6OCOOCH_3$, $HOCOOC_2H_4OCOOCH_3$, $HOCOOC_3H_6OCOOCH_3$, $HOC_2H_4OCH_2H_5$, $HOCOOC_2H_4OCOOC_2H_5$, $HOCOOC_3H_6OCOOC_2H_5$, $CH_3OC_2H_4OCH_3$, $CH_3OCH_3H_6OCH_3$, $CH_3OC_2H_4OCOOCH_3$, $CH_3OC_3H_6OCOOCH_3$, $CH_3OC_2H_4OC_2H_5$, $CH_3OC_3H_6C_2H_5$, $CH_3OC_2H_4OCOOC_2H_5$, $CH_3OC_3H_6OCOOC_2H_5$, $CH_3OCOOC_2H_4OCOOC_2H_5$, $CH_3OCOOC_3H_6OCOOC_2H_5$, $C_2H_5OC_2H_4OC_2H_5$, $C_2H_5OC_3H_6OC_2H_5$, $C_2H_5OC_2H_4OCOOC_2H_5$, $C_2H_5OC_3H_6OCOOC_2H_5$, $C_2H_5OCOOC_2H_4OCOOC_2H_5$ and $C_2H_5OCOOC_3H_6OCOOC_2H_5$.

In the present embodiment, examples of methods for containing the above-mentioned compounds represented by formulas (1) to (3) in the positive electrode active material layer of a positive electrode include a method consisting of mixing the compounds represented by formulas (1)-(3) in the positive electrode active material layer, a method consisting of adsorbing the compounds represented by formulas (1)-(3) to the positive electrode active material layer, a method consisting of electrochemically depositing the compounds represented by formulas (1)-(3) on the positive electrode active material layer, and a method consisting of containing a precursor capable of forming these compounds by decomposition in a nonaqueous electrolyte, decomposing the precursor when fabricating a lithium ion secondary battery, and accumulating these compounds in the positive electrode active material layer. Among these, the method consisting of containing a precursor capable of forming these compounds by decomposition in a nonaqueous electrolyte, decomposing the precursor when fabricating a lithium ion secondary battery, and accumulating these compounds in the positive electrode active material layer is preferable. Details of this method will be subsequently described.

(Optional Component)

Although the positive electrode active material layer in the present embodiment contains a positive electrode active material, a lithium compound other than the positive electrode active material, and optionally, an alkaline metal compound and compound represented by formulas (1)-(3), an optional component such as a conductive filler, binder or dispersion stabilizer may be further contained as necessary in addition thereto.

Examples of conductive fillers that can be used include, but are not limited to, acetylene black, ketjen black, vapor-grown carbon fibers, graphite, carbon nanotubes and mixtures thereof. The amount of conductive filler used based on 100 parts by weight of the positive electrode active material is preferably greater than 0 parts by weight to 30 parts by weight, more preferably greater than 0 parts by weight to 25 parts by weight, and even more preferably 1 part by weight to 20 parts by weight. If the mixed amount is 30 parts by weight or less, the content ratio of positive electrode active material in the positive electrode active material layer increases and energy density per positive electrode active material layer volume can be secured.

Examples of binders that can be used include, but are not limited to, polyvinylidene fluoride (PVdF), polytetrafluoroethylene (PTFE), polyimide, latex, styrene-butadiene copolymer, fluororubber and acrylic copolymers. Since positive electrode coating solutions become basic as a result of containing a lithium compound, the ends of a binder polymer are preferably modified by hydrogenation treatment to impart resistance to base. The amount of binder used based on 100 parts by weight of the positive electrode active material is preferably 1 part by weight to 30 parts by weight, more preferably 1 part by weight to 15 parts by weight and even more preferably 1 part by weight to 10 parts by weight. If the amount of binder is 1 wt % or more, adequate electrode strength is demonstrated. If the amount of binder is 30 parts by weight or less, ion access to the positive electrode active material and diffusion therein is not inhibited, thereby demonstrating high input/output characteristics.

Examples of dispersion stabilizers that can be used include, but are not limited to, polyvinylpyrrolidone (PVP), polyvinyl alcohol (PVA) and cellulose derivatives. The amount of dispersion stabilizer used based on 100 parts by weight of the positive electrode active material is preferably greater than 0 parts by weight to 10 parts by weight. If the amount of dispersion stabilizer is 10 parts by weight or less, ion access to the positive electrode active material and diffusion therein is not inhibited, thereby demonstrating high input/output characteristics.

(Physical Properties of Positive Electrode Active Material Layer)

—Thickness—

The thickness of the positive electrode active material layer per side of the positive electrode current collector is preferably 20 μm to 200 μm, more preferably 25 μm to 150 μm, and even more preferably 30 μm to 120 μm. If the thickness of the positive electrode active material layer is 20 μm or more, adequate charge/discharge capacity can be demonstrated. If the thickness of the positive electrode active material layer is 200 μm or less, ion diffusion resistance within the positive electrode can be maintained at a low level. Consequently, in addition to allowing the obtaining of adequate output characteristics, cell volume can be reduced thereby making it possible to increase energy density. The thickness of the positive electrode active material layer in the case the current collector has through holes or surface irregularities refers to the mean value of thickness per side of the portion where the current collector does not have through holes or surface irregularities.

—Bulk Density—

The bulk density of the positive electrode active material layer is preferably 1.0 g/cm$^3$ or more and more preferably within the range of 1.2 g/cm$^3$ to 4.5 g/cm$^3$. If the bulk density of the positive electrode active material layer is 1.2 g/cm$^3$ or more, high energy density can be demonstrated and size reduction of a power storage element can be achieved. If the bulk density of the positive electrode active material layer is 4.5 g/cm$^3$ or less, diffusion of electrolyte in pores within the positive electrode active material layer is adequate and high output characteristics are obtained.

—Peel Strength between Positive Electrode Active Material Layer and Positive Electrode Current Collector—

The peel strength between the positive electrode active material layer and the positive electrode current collector is preferably 0.01 N/cm to 2.00 N/cm. If the peel strength is 0.01 N/cm or more, separation of the positive electrode active material layer due to generation of gas in the pre-doping step to be subsequently described can be suppressed and micro-short circuits can be inhibited. If the peel strength is 2.00 N/cm or less, since this means that excess binder is not present in the positive electrode active material layer, diffusivity of electrolyte improves and resistance can be lowered. Peel strength of the positive electrode active material layer is more preferably 0.02-1.50 N/cm and even more preferably 0.03-1.00 N/cm.

The peel strength of the positive electrode active material layer in the positive electrode of the lithium ion secondary battery of the present embodiment is the value obtained by disassembling and accurately extracting the lithium ion secondary battery, cleaning with a solvent such as ethyl methyl carbonate to clean off electrolyte adhered to the positive electrode, and measuring after having dried in a vacuum for 24 hours in an environment at 25° C.

Peel strength of the positive electrode active material layer can be measured by a known method, and for example, a peel test in compliance with Testing Methods of Pressure-sensitive Adhesive Tapes and Sheets of JIS Z0237 (2009), or a testing method used in the examples to be subsequently described, may be used.

<<Negative Electrode>>

The negative electrode in the present embodiment has a negative electrode current collector and a negative electrode active material layer containing a negative electrode active material provided on one side or both sides thereof

[Negative Electrode Current Collector]

A metal foil that has high electron conductivity, elutes in a nonaqueous electrolyte, and is resistant to deterioration caused by reaction with electrolyte or ions, is preferable as a material that composes the negative electrode current collector in the present embodiment. Examples of this metal foil include, but are not limited to, aluminum foil, copper foil, nickel foil and stainless steel foil. Copper foil is preferable as the negative electrode current collector in the lithium ion secondary battery of the present embodiment.

The metal foil may be a metal foil in the form of a flat film free of surface irregularities and through holes, a metal foil having surface irregularities formed by embossing, chemical etching, electrolytic deposition or blasting, or a metal foil having through holes such as expanded metal, perforated metal or etched foil.

Although there are no particular limitations thereon provided the shape and strength of the negative electrode can be adequately retained, the thickness of the negative electrode current collector is preferably, for example, 1-100 μm.

<Negative Electrode Active Material Layer>

The negative electrode active material layer contains a negative electrode active material capable of occluding and releasing lithium ions, and may also contain an optional component such as a conductive filler, binder or dispersion stabilizer as necessary.

[Negative Electrode Active Material]

A substance capable of occluding and releasing lithium ions can be used as a negative electrode active material. More specifically, the negative electrode active material:

contains a carbon material as a first negative electrode active material, and contains at least one type among silicon, silicon compounds, tin and tin compounds as a second negative electrode active material.

The second negative electrode active material is able to form an alloy with lithium and is therefore referred to as an "alloy-based active material".

(First Negative Electrode Active Material: Carbon Material)

The negative electrode active material contains a carbon material as a first negative electrode active material.

Examples of carbon materials include amorphous or microcrystalline carbon materials, nanocarbon and crystalline carbon materials. Examples of amorphous or microcrystalline non-graphitizable carbon, graphitizable carbon, carbon black and activated carbon, examples of nanocarbon include carbon nanoparticles, fullerene and graphene, and examples of crystalline carbon materials include graphite. Examples of graphite include artificial graphite, natural graphite, graphitized mesophase carbon spheres, graphite whiskers and composite carbon materials thereof.

Among these carbon materials, graphite is preferable from the viewpoint of increasing capacity of the lithium ion secondary battery, and one or more types selected from artificial graphite, natural graphite, graphitized mesophase carbon spheres, graphite whiskers and composite carbon materials thereof are used preferably.

(Second Negative Electrode Active Material: Alloy-Based Active Material)

The negative electrode active material contains at least one type (of alloy-based active material) among silicon, silicon compounds, tin and tin compounds. The silicon compound is preferably a silicon oxide and more preferably that represented by $SiO_x$ (wherein, $0.01 \leq x \leq 2$).

The tin compound is preferably a tin oxide and more preferably tin dioxide ($SnO_2$).

The second negative electrode active material may have the form of a composite material obtained by compounding with carbon or a carbonaceous material.

(Usage Ratios of First Negative Electrode Active Material and Second Negative Electrode Active Material)

In the present embodiment, the first negative electrode active material is contained at a ratio of 50 wt % to 95 wt % and the second negative electrode active material is contained at a ratio 5 wt % to 50 wt % based on the total weight of the above-mentioned negative electrode active material layer. If the amount of the second negative electrode active material is 5 wt % or more, the film thickness of the negative electrode can be reduced and energy density of the lithium ion secondary battery can be increased. If the amount of the second negative electrode active material is 50 wt % or less, irreversible capacity of the negative electrode during initial charging and discharging can be reduced, the amount of lithium compound contained in the positive electrode precursor can be decreased and the energy density of the lithium ion secondary battery can be increased.

The ratio of the first negative electrode active material based on the total weight of the above-mentioned negative electrode active material layer is 50 wt % to 95 wt % and may be 55 wt % to 95 wt %.

Use of graphite for the first negative electrode active material and making the concentration of graphite contained in the negative electrode active material layer to be 55 wt % to 95 wt % based on the total weight of the negative electrode active material layer is particularly preferable from the viewpoint of increasing capacity of the lithium ion secondary battery.

The ratio of the second negative electrode active material based on the total weight of the above-mentioned negative electrode active material layer is 5 wt % to 50 wt % and may be 5 wt % to 35 wt %. In the case the second negative electrode active material is in the form of a composite material of an alloy-based material and carbon or carbonaceous material, the ratio of the second negative electrode active material is calculated based on the weight obtained by excluding the carbon or carbonaceous material.

In the present embodiment, the total content ratio of the first and second negative electrode active materials in the negative electrode active material layer of the negative electrode based on the total weight of the negative electrode active material layer is preferably 70 wt % or more and more preferably 80 wt % or more.

(Mean Particle Diameter of Negative Electrode Active Material)

The mean particle diameter of the negative electrode active material is preferably 1 μm to 20 μm, the lower limit thereof is more preferably 2 μm or more and even more preferably 3 μm or more, and the upper limit thereof is more preferably 18 μm or less and even more preferably 15 μm or less. If the mean particle diameter is 1 μm or more, resistance of the lithium ion secondary battery can be lowered since the contact area with nonaqueous electrolyte increases. If the mean particle diameter of the negative electrode active material is 20 μm or less, the energy density of the lithium ion secondary battery can be improved since the thickness of the negative electrode active material layer can be adequately reduced.

The mean particle diameter of the negative electrode active material can be measured in the same manner as mean particle diameter of the positive electrode active material.

The mean particle diameter of the negative electrode active material can be adjusted by pulverizing using a wet or dry jet mill equipped with a built-in classifier or an agitated ball mill. The classifier is equipped with a centrifugal classifier, and fine particles that have been pulverized in an inert gas atmosphere of nitrogen or argon can be captured with a cyclone collector or dust collector.

[Optional Component]

The negative electrode active material layer in the present embodiment may also contain an optional component such as a conductive filler, pressures-sensitive adhesive or dispersion stabilizer as necessary in addition to the negative electrode active material.

There are no particular limitations on the type of conductive filler, and examples thereof include acetylene black, ketjen black and vapor-grown carbon fibers. The amount of conductive filler used based on 100 wt % of the negative electrode active material is preferably greater than 0 wt % to 30 wt %, more preferably greater than 0 wt % to 20 wt %, and even more preferably greater than 0 wt % to 15 wt %.

There are no particular limitations on the binder, and examples of binders that can be used include polyvinylidene fluoride (PVdF), polytetrafluoroethylene (PTFE), polyimide, latex, styrene-butadiene copolymer, fluororubber, acrylic copolymers, polyacrylic acid and polyglutamic acid. The amount of binder used based on 100 wt % of the negative electrode active material is preferably 1 wt % to 20 wt %, more preferably 2 wt % to 15 wt % and even more preferably 3 wt % to 10 wt %. If the amount of binder is 1 wt % or more, adequate electrode strength is demonstrated. If the amount of binder is 20 wt % or less, access of lithium ions to the negative electrode active material is not inhibited and high input/output characteristics are demonstrated.

There are no particular limitations on the dispersion stabilizer and examples of dispersion stabilizers that can be used include polyvinylpyrrolidone (PVP), polyvinyl alcohol (PVA) and cellulose derivatives. The amount of dispersion stabilizer used based on 100 wt % of the negative electrode active material is preferably 0 wt % to 10 wt %. If the amount of dispersion stabilizer is 10 wt % or less, access of lithium ions to the negative electrode active material is not inhibited and high input/output characteristics are demonstrated.

(Physical Properties of Negative Electrode Active Material Layer)

—Thickness—

The thickness of the negative electrode active material layer per side of the negative electrode current collector is preferably 5 µm to 100 µm. The lower limit of thickness of the negative electrode active material layer is more preferably 7 µm or more and even more preferably 10 µm or more. The upper limit of thickness of the negative electrode active material layer is more preferably 80 µm or less and even more preferably 60 µm or less. If the thickness of the negative electrode active material layer is 5 µm or more, there is less susceptibility to the formation of streaks when coating the negative electrode active material layer resulting in superior coatability. If the thickness of the negative electrode active material layer is 100 µm or less, high energy density can be realized as a result of reducing cell volume. The thickness of the negative electrode active material layer in the case the negative electrode current collector has surface irregularities refers to the mean value of thickness of the negative electrode active material layer per side of the portion where the negative electrode current collector does not have surface irregularities.

—Bulk Density—

The bulk density of the negative electrode active material layer is preferably 0.50 g/cm$^3$ to 3.00 g/cm$^3$, more preferably 0.60 g/cm$^3$ to 2.50 g/cm$^3$, and even more preferably 0.70 g/cm$^3$ to 2.00 g/cm$^3$. If the bulk density of the negative electrode active material layer is 0.50 g/cm$^3$ or more, in addition to being able to retain adequate strength, adequate conductivity with the negative electrode active material can be demonstrated. If the bulk density of the negative electrode active material layer is 3.00 g/cm$^3$ or less, pores can be secured that enable ions within the negative electrode active material layer to adequately diffuse.

<Separator>

The positive electrode and negative electrode are typically laminated or wound with a separator interposed there between and form an electrode body having the positive electrode, negative electrode and separator (electrode laminate or electrode wound body).

<Separator>

A polyethylene microporous film or polypropylene microporous film used in lithium ion secondary batteries or cellulose nonwoven paper used in electric double layer capacitors can be used as a separator. A film composed of organic or inorganic fine particles may also be laminated on one side or both sides of these separators. Organic or inorganic fine particles may also be contained within the separators.

The thickness of the separator is preferably 5 µm to 35 µm. If the thickness of the separator is 5 µm or more, self-discharge caused by internal micro-short circuiting tends to be smaller, thereby making this preferable. As a result of making the thickness of the separator to be 35 µm or less, output characteristics of a nonaqueous alkaline metal storage battery such as a lithium ion secondary battery tend to improve, thereby making this preferable.

The thickness of the film composed of organic or inorganic microparticles is preferably 1 µm to 10 µm. As a result of making the thickness of the film composed of organic or inorganic fine particles to be 1 µm or more, self-discharge caused by internal micro-short circuiting tends to be smaller, thereby making this preferable. As a result of making the thickness of the film composed of organic or inorganic fine particles to be 10 µm or less, output characteristics of a nonaqueous alkaline metal storage battery such as a lithium ion secondary battery tend to improve, thereby making this preferable.

In one embodiment of the lithium ion secondary battery of the present invention, the separator may contain an organic polymer that swells due to penetration of nonaqueous electrolyte, or an organic polymer may be used alone instead of a separator. Although there are no particular limitations thereon, the organic polymer is preferably that which has favorable affinity with nonaqueous electrolyte and gels as a result of swelling following penetration of electrolyte. Examples of organic polymers that can be used preferably due to being able to demonstrate high lithium ion conductivity when gelled include polyethylene oxide, polyacrylonitrile, polyvinylidene fluoride, polymethyl methacrylate and mixtures thereof.

The organic polymer is able to contain electrolyte within the organic polymer. In this case, this is effective in preventing the outflow of electrolyte from the lithium ion secondary battery to the outside when the outer casing has been damaged, thereby making this preferable in terms of safety.

<Nonaqueous Electrolyte>

The electrolyte in the present embodiment is a nonaqueous electrolyte containing lithium ions as electrolyte and a nonaqueous solvent to be subsequently described.

The nonaqueous electrolyte in the present embodiment is only required to contain lithium ions, and in addition to lithium ions, may also contain an electrolyte comprised of alkaline metal ions such as sodium ions or potassium ions or alkaline earth metal ions such as magnesium ions or calcium ions.

(Lithium Salt)

In the present embodiment, the lithium ions as electrolyte are preferably formed by ionization of a lithium salt added to the nonaqueous solvent.

In the present embodiment, the nonaqueous electrolyte preferably contains a lithium salt containing fluorine atoms as the lithium salt.

Examples of lithium salts containing fluorine atoms include $LiPO_2F_2$, $LiN(SO_2F)_2$, $LiN(SO_2CF_3)_2$, $LiN(SO_2C_2F_5)_2$, $LiN(SO_2CF_3)(SO_2C_2F_5)$, $LiN(SO_2CF_3)(SO_2C_2F_4H)$, $LiC(SO_2F)_3$, $LiC(SO_2CF_3)_3$, $LiC(SO_2C_2F_5)_3$, $LiCF_3SO_3$, $LiC_4F_9SO_3$, $LiPF_6$ and $LiBF_4$.

The nonaqueous electrolyte preferably contains $LiPO_2F_2$ at a ratio of 0.001 wt % to 5.000 wt %. Although the reason for this is uncertain, in the case $LiPO_2F_2$ is contained at 0.001 wt % or more, side reaction products formed by decomposition of the lithium compound other than the positive electrode active material can be captured in the pre-doping step to be subsequently described, and this is thought to make it possible to inhibit deterioration of the positive electrode active material. In the case the content of $LiPO_2F_2$ is 5.000 wt % or less, electrical conductivity of the nonaqueous electrolyte increases and this is thought to make it possible to increase the output of the lithium ion secondary battery.

$LiPO_2F_2$ can be quantified by carrying out $^{19}F$-NMR on the nonaqueous electrolyte. For example, a peak corresponding to the standard substance appears at about −140 ppm if $C_6H_2F_6$ is used for the internal standard. The peak corresponding to $LiPO_2F_2$ appears at about −85 to −90 ppm. $LiPO_2F_2$ can be quantified from each peak area ratio and the added amount of the standard substance, and the concentration of $LiPO_2F_2$ can be calculated from the weight of the sample measured by $^{19}F$-NMR and the quantitative value of $LiPO_2F_2$.

The nonaqueous electrolyte may also contain one or more types of lithium salts selected from $LiPF_6$, $LiBF_4$, $LiN(SO_2F)_2$, $LiN(SO_2F)(SO_2CF_3)$, $LiN(SO_2CF_3)_2$ and $LiClO_4$ instead of or in addition to $LiPO_2F_2$.

In order to be able to demonstrate high conductivity, the lithium salt contained in the nonaqueous electrolyte in the lithium ion secondary battery preferably contains:

$LiPO_2F_2$ and further contains one or more types selected from $LiPF_6$, $LiBF_4$, $LiN(SO_2F)_2$, $LiN(SO_2F)(SO_2CF_3)$, $LiN(SO_2CF_3)_2$ and $LiClO_4$, and more preferably contains $LiPO_2F_2$ and further contains one or more types selected from $LiPF_6$, $LiN(SO_2CF_3)_2$ and $LiBF_4$.

The nonaqueous electrolyte may further contain a lithium salt that does not contain fluorine atoms, such as $LiClO_4$, in addition to these lithium salts containing fluorine atoms.

The concentration of lithium salt in the nonaqueous electrolyte as the total concentration of lithium salts is preferably 0.5 mol/L or more, and more preferably within the range of 0.5-2.0 mol/L. If the lithium salt concentration is 0.5 mol/L or more, battery capacity can be made to be sufficiently high since ample anions are present. In the case the lithium salt concentration is 2.0 mol/L or less, precipitation of undissolved lithium salt in the nonaqueous electrolyte and excessively high viscosity of the nonaqueous electrolyte can be prevented and there is less susceptibility to decreases in conductivity and output characteristics, thereby making this preferable.

(Nonaqueous Solvent)

The nonaqueous electrolyte in the present embodiment preferably contains a cyclic carbonate and linear carbonate as nonaqueous solvents (organic solvents). The containing of a cyclic carbonate and linear carbonate by the nonaqueous electrolyte is advantageous in terms of dissolving a desired concentration of lithium salt and demonstrating high ionic conductivity. Examples of cyclic carbonates include alkylene carbonate compounds represented by ethylene carbonate, propylene carbonate and butylene carbonate. The alkylene carbonate compounds are typically unsubstituted. Examples of linear carbonates include dialkyl carbonate compounds represented by dimethyl carbonate, diethyl carbonate, methyl ethyl carbonate, dipropyl carbonate and dibutyl carbonate. The dialkyl carbonate compounds are typically unsubstituted and preferably consist of one or more types selected from dimethyl carbonate, ethyl methyl carbonate and diethyl carbonate.

The total content of cyclic carbonate and linear carbonate based on the total weight of the nonaqueous electrolyte is preferably 50 wt % or more, more preferably 65 wt % or more, even more preferably 95 wt % or less and still more preferably 90 wt % or less. If the total content of cyclic carbonate and linear carbonate is 50 wt % or more, an alkaline metal salt can be dissolved to a desired concentration and high ionic conductivity can be demonstrated. If the total concentration of cyclic carbonate and linear carbonate is 95 wt % or less, the electrolyte can further contain an additive to be subsequently described.

The ratio between cyclic carbonate and linear carbonate as the weight ratio of cyclic carbonate to the total weight of both is preferably 15-50 wt %, more preferably 20-45 wt % and particularly preferably 25-40 wt %.

(Additive)

The nonaqueous electrolyte in the present embodiment may further contain an additive. There are no particular limitations on the additive, examples thereof include sultone compounds, cyclic phosphazenes, acyclic fluorine-containing ethers, fluorine-containing cyclic carbonates, cyclic carbonates, cyclic carboxylates and cyclic acid anhydrides, and these can be used alone or two or more types may be used by mixing.

(Water Concentration)

The concentration of water contained in the nonaqueous electrolyte in the present embodiment is preferably 1 ppm to 5,000 ppm. If the water concentration is 1 ppm or more, pre-doping can be promoted by only dissolving a small amount of lithium compound in the positive electrode precursor. If the water concentration is 5,000 ppm or less, side reactions during pre-doping can be inhibited.

<<Method for Producing Lithium Ion Secondary Battery>>

The lithium ion secondary battery in the present embodiment can be produced according to the method indicated below using a positive electrode precursor and negative electrode molded in the manner previously described.

A method for producing a lithium ion secondary battery including the following steps in the order described:

(1) housing a laminate comprised of a positive electrode precursor containing a positive electrode active material and a lithium compound, a negative electrode and a separator in an outer casing (cell assembly);

(2) injecting a nonaqueous electrolyte into the outer casing (electrolyte injection); and, (3) applying a voltage of 4.2 V or more between the positive electrode precursor and the negative electrode at an environmental temperature of 20° C. to 60° C. to decompose the lithium compound (pre-doping).

(1) Cell Assembly

<Positive Electrode Precursor>

The positive electrode precursor in the present embodiment has a positive electrode active material layer. This positive electrode active material layer contains a positive electrode active material and may optionally contain a lithium compound other than the positive electrode material and at least one type of alkaline metal atoms selected from the group consisting of Na atoms and K atoms.

The positive electrode precursor has a positive electrode current collector and a positive electrode active material layer present on one side or both sides thereof so as to be able to compose the positive electrode of a lithium ion secondary battery.

The positive electrode precursor of the present embodiment composes a positive electrode following assembly and pre-doping of a power storage element. As will be subsequently described, the negative electrode is preferably pre-doped with lithium ions during assembly of the power storage element in the present embodiment. The pre-doping method preferably consists of assembling a power storage element using the positive electrode precursor, negative electrode, separator, outer casing and nonaqueous electrolyte of the present embodiment followed by applying a voltage between the positive electrode precursor and the negative electrode.

In the present embodiment, since the negative electrode can be pre-doped by using the lithium compound serving as the positive electrode active material together with a lithium compound other than the positive electrode active material as the dopant source during pre-doping provided a lithium compound other than the positive electrode active material is contained in the positive electrode precursor, the power storage element can be electrochemically charged and discharged as a lithium ion secondary battery even if lithium ions are not preliminarily contained in the negative electrode prior to pre-doping.

(Positive Electrode Current Collector)

The positive electrode current collector in the positive electrode precursor is suitably selected corresponding to the desired positive electrode current collector in the positive electrode.

(Positive Electrode Active Material)

The positive electrode active material in the positive electrode precursor is suitably selected corresponding to the desired positive electrode active material in the positive electrode.

(Lithium Compound Other than Positive Electrode Active Material)

The lithium compound other than the positive electrode active material in the present embodiment is a compound that enables pre-doping by being reduced at the negative electrode by decomposing and releasing lithium ions in the positive electrode precursor.

One or more types selected from, for example, lithium carbonate, lithium oxide, lithium hydroxide, lithium formate, lithium acetate, lithium fluoride, lithium chloride, lithium bromide, lithium iodide, lithium nitrate, lithium sulfate, lithium sulfite, lithium phosphate and lithium oxalate are preferably used as such as lithium compound. Among these, lithium carbonate is used preferably from the viewpoint of high capacity per unit weight. One type of lithium compound or two or more types of lithium compounds may be contained in the positive electrode precursor. The lithium compound other than the positive electrode active material contained in the positive electrode precursor is preferably contained at 1 wt % to 15 wt % and more preferably at 3 wt % to 13 wt %. If the content of the lithium compound is 1 wt % or more, capacity of the lithium ion secondary battery increases since lithium ions used to pre-dope the second negative electrode active material are adequately secured. If the content of the lithium compound is 15 wt % or less, decomposition of the lithium compound is promoted due to increased electron conductivity in the positive electrode precursor, thereby enabling pre-doping to be completed in a short period of time.

The mean particle diameter of the lithium compound other than the positive electrode active material is preferably 0.1 μm to 10 μm. If the mean particle diameter is 0.1 μm or more, dispersibility in the positive electrode precursor is superior. If the mean particle diameter of 10 μm or less, the surface area of the lithium compound increases, thereby enabling the decomposition reaction to proceed efficiently.

Various methods can be used to obtain fine particles of the lithium compound. For example, a pulverizer such as a ball mill, bead mill, ring mill, jet mill or rod mill can be used.

(Alkaline Metal Atoms)

At least one type of alkaline metal atoms selected from the group consisting of Na atoms and K atoms are preferably contained in the positive electrode active material layer in the positive electrode precursor of the present embodiment at a concentration of 1 ppm to 500 ppm. If the alkaline metal atoms are contained at 1 ppm or more, the lithium compound can be decomposed under milder conditions thereby making it possible to inhibit side reactions during pre-doping. In the case the concentration of alkaline metal atoms is 500 ppm or less, insertion and removal of sodium or potassium ions having a larger ionic radius to and from the positive electrode active material are inhibited, thereby improving cycle characteristics.

There are no particular limitations on the method used to contain the alkaline metal atoms in the positive electrode active material layer of the positive electrode precursor, and examples thereof include a method consisting of mixing in a compound containing alkaline metal atoms during dispersing the positive electrode coating solution, a method consisting of mixing in a compound containing alkaline metal atoms when synthesizing the positive electrode active material by firing, and a method consisting of mixing in a compound containing alkaline metal atoms when synthesizing the lithium compound.

Quantification of the lithium and alkaline metal atoms contained in the positive electrode active material layer can be carried out by ICP-AES, atomic absorption spectrometry, X-ray fluorescence analysis, neutron activation analysis or ICP-MS.

(Production of Positive Electrode Precursor)

The positive electrode precursor has a positive electrode active material layer on one side or both sides of a positive electrode current collector. The positive electrode active material layer is typically adhered to one side or both sides of the positive electrode current collector.

In the present embodiment, the positive electrode precursor is able to compose a positive electrode by producing according to a known positive electrode production technology used in lithium ion secondary batteries followed by undergoing pre-doping. For example, a slurry-like coating solution can be prepared by dispersing or dissolving a positive electrode active material, and optionally dispersing or dissolving a lithium compound other than the positive electrode active material and at least one type of alkaline metal atoms selected from the group consisting of Na atoms and K atoms, as well as other optional components used as necessary, in water or organic solvent (such as N-methyl-2-pyrrolidone) followed by forming a coated film by coating this coating solution onto one side or both sides of a positive electrode current collector and then drying to obtain a positive electrode precursor. The resulting positive electrode precursor may be pressed to adjust the film thickness and bulk density of the positive electrode active material layer. Alternatively, a positive electrode active material, lithium compound and other optional components used as necessary can be dry-mixed and the resulting mixture can be press-molded followed by affixing to the positive electrode current collector using a conductive adhesive.

The positive electrode precursor coating solution is prepared by dry-blending all or a portion of various types of material powders containing a positive electrode active material, and preferably further containing a lithium compound other than the positive electrode active material as well as at least one type of alkaline metal atoms selected from the group consisting of Na atoms and K atoms, and adding a liquid or slurry-like mixture, in which water or organic solvent, and optional components as necessary, are dissolved or dispersed, to the resulting dry blend. Alternatively, the positive electrode precursor coating solution may also be prepared by adding a material powder containing a positive electrode active material, and preferably further containing a lithium compound other than the positive electrode active material as well as at least one type of alkaline metal atoms selected from the group consisting of Na atoms and K atoms, to a liquid or slurry-like mixture, in which optional components are dissolved or dispersed in water or organic solvent, either simultaneously or in an arbitrary order.

The dry blending method may consist of, for example, pre-mixing the positive electrode active material, lithium compound, and as necessary, a conductive filler, and coating a conductive material on a lithium compound having low conductivity. As a result, the lithium compound easily decomposes in the positive electrode precursor during pre-doping to be subsequently described. In the case of using water as the solvent of the coating solution, a pH adjuster may be added as necessary since the coating solution may become basic due to addition of the lithium compound.

There are no particular limitations on the dissolution or dispersion method, and a dispersing machine such as a homodisper, multi-shaft disperser, planetary mixer or thin film system high-speed mixer can be used preferably. In order to obtain a well-dispersed coating solution, dispersion is preferably carried out at a peripheral velocity of 1 m/s to 50 m/s. If peripheral velocity is 1 m/s or more, each type of material is favorably dissolved or dispersed, thereby making this preferable. If peripheral velocity is 50 m/s or less, there is little destruction of the materials due to heat, shear force or both caused by dispersion, and re-aggregation is inhibited, thereby making this preferable.

The degree of dispersion of the coating solution in terms of particle size as measured with a grind gauge is preferably 0.1 µm to 100 µm, and the upper limit thereof is more preferably 80 µm or less and even more preferably 50 µm or less. If particle size is 0.1 µm or more, this means that the materials are not pulverized excessively during production of the coating solution, thereby making this preferable. If particle size is 100 µm or less, the coating solution can be sprayed stably without the occurrence of clogging during discharge of the coating solution or streaking of the coated film.

The viscosity ($\eta b$) of the positive electrode precursor coating solution is preferably 1,000 mPa·s to 20,000 mPa·s, more preferably 1,500 mPa·s to 10,000 mPa·s, and even more preferably 1,700 mPa·s to 5,000 mPa·s. If viscosity ($\eta b$) is 1,000 mPa·s or more, running of the coating solution when forming a coated film is inhibited and coated film width and thickness can be favorably controlled. If viscosity ($\eta b$) is 20,000 mPa·s or less, the coating solution can be coated stably with little pressure loss in the coating solution flow path when using a coating machine and the thickness of the coated film can be controlled to equal to or less than a desired coated film thickness.

The thixotropic index (TI) value of the coating solution is preferably 1.1 or more, more preferably 1.2 or more and even more preferably 1.5 or more. If the Ti value is 1.1 or more, the coated film width and thickness can be favorably controlled.

There are no particular limitations on the formation of the coated film of the positive electrode precursor and a coating machine such as a die coater, comma coater, knife coater or gravure coating machine can be used preferably. The coated film may be formed by single layer coating or multilayer coating. In the case of multilayer coating, the composition of the coating solution may be adjusted so that the content of the lithium compound in each layer of the coated film differs. The coating speed is preferably 0.1 m/min to 100 m/min, more preferably 0.5 m/min to 70 m/min and even more preferably 1 m/min to 50 m/min. If the coating speed is 0.1 m/min or more, the coating solution can be coated stably. If the coating speed is 100 m/min or less, coating accuracy can be adequately secured.

There are no particular limitations on drying the coated film of the positive electrode precursor and drying such as hot air drying or infrared (IR) drying can be used preferably. Drying of the coated film may be carried out at a single temperature or by incrementally changing the temperature. A plurality of drying methods may also be combined. The drying temperature is preferably 25° C. to 200° C., more preferably 40° C. to 180° C., and even more preferably 50° C. to 160° C. If the drying temperature is 25° C. or higher, the solvent in the coated film can be adequately evaporated. If the drying temperature is 200° C. or lower, uneven distribution of binder attributable to migration as well as oxidation of the positive electrode current collector and positive electrode active material layer can be inhibited.

There are no particular limitations on pressing the positive electrode precursor and a pressing machine such as a hydraulic press or pneumatic press can be used preferably. The film thickness, bulk density and electrode strength of the positive electrode active material layer can be adjusted by the pressing force, gap and surface temperature of the press to be subsequently described. The pressing force is preferably 0.5 kN/cm to 20 kN/cm, more preferably 1 kN/cm to 10 kN/cm and even more preferably 2 kN/cm to 7 kN/cm. If the pressing force is 0.5 kN/cm or more, electrode strength can be made to be sufficiently high. If the pressing force is 20 kN/cm or less, there is little occurrence of deflection or wrinkling in the positive electrode precursor and the positive electrode active material layer can be adjusted to a desired film thickness and bulk density. The gap between press rollers can be set to an arbitrary value corresponding to the film thickness of the positive electrode precursor after drying so that the positive electrode active material layer has a desired film thickness and bulk density. The pressing speed can be set to an arbitrary speed so as to suppress deflection and wrinkling in the positive electrode precursor.

The surface temperature of the press unit may be at room temperature or the press unit may be heated as necessary. The lower limit of the surface temperature of the press unit in the case of heating is preferably 60° C. or more lower, more preferably 45° C. or more lower and even more preferably 30° C. or more lower than the melting point of the binder used. The upper limit of the surface temperature of the press unit in the case of heating is preferably 50° C. or less above, more preferably 30° C. or less above, and even more preferably 20° C. or less above the melting point of the binder used. For example, in the case of using polyvinylidene fluoride (PVdF, melting point: 150° C.) for the binder, the press unit is preferably heated to 90° C. to 200° C., more preferably to 105° C. to 180° C., and even more preferably to 120° C. to 170° C. In the case of using styrene-butadiene copolymer (melting point: 100° C.) for the binder, the press unit is preferably heated to 40° C. to 150° C., more preferably to 55° C. to 130° C. and even more preferably to 70° C. to 120° C.

The melting point of the binder can be determined by the location of the endothermic peak in differential scanning calorimetry (DSC). For example, the melting point is the endothermic peak temperature observed during the heating process when 10 mg of a sample resin are placed in a measurement cell using the "DSC7" differential scanning calorimeter manufactured by PerkinElmer, Inc. followed by heating in a nitrogen gas atmosphere from a temperature of 30° C. to 250° C. at a heating rate of 10° C./min.

Pressing may be carried out multiple times while changing conditions consisting of the pressing force, gap, speed and surface temperature of the press unit.

The peel strength between the positive electrode active material layer and the positive electrode current collector in the positive electrode precursor of the present embodiment is 0.01 N/cm to 2.00 N/cm. If the peel strength is 0.01 N/cm or more, separation of the positive electrode active material layer due to generation of gas in the pre-doping step to be subsequently described can be suppressed and micro-short circuits can be inhibited. If the peel strength is 2.00 N/cm or less, since this means that excess binder is not present in the positive electrode active material layer, diffusivity of electrolyte improves and resistance can be lowered. Peel strength of the positive electrode active material layer is more preferably 0.02-1.50 N/cm and even more preferably 0.03-1.00 N/cm.

Peel strength of the positive electrode active material layer in the positive electrode precursor is the measured value obtained by disassembling the electrode body and extracting the positive electrode precursor.

When the area ratio of carbonate ion mapping in an image obtained by micro Raman spectroscopy of the surface of the positive electrode precursor in the present embodiment is defined as A (%), and the concentration of the lithium compound other than the positive electrode active material contained in the positive electrode active material layer is defined as Y (wt %), then A is 1% to 30% and $0.5 \leq A/Y \leq 2.0$.

Measurement of the ratio A/Y is the value calculated according to the calculation method described in the examples using an image obtained by micro Raman spectroscopy obtained according to the method to be subsequently described.

<Negative Electrode>

Prior to assembly, the negative electrode has the desired configuration in the negative electrode of the resulting lithium ion secondary battery with the exception of not being pre-doped with lithium ions.

Thus, the negative electrode at this point has:

a negative electrode current collector and a negative electrode active material layer provided on one side or both sides of the negative electrode current collector, and the negative electrode active material layer contains a first negative electrode active material and a second negative electrode active material.

The explanations of the negative electrode current collector, first negative electrode active material and second negative electrode active material in the resulting lithium ion secondary battery can be directly referenced regarding the negative electrode current collector, first negative electrode active material and second negative electrode active material.

(Production of Negative Electrode)

The negative electrode has a negative electrode active material layer on one side or both sides of a negative electrode current collector. The negative electrode active material layer is typically adhered to one side or both sides of the negative electrode current collector. This negative electrode can be produced in the same manner as the production of the positive electrode current collector with the exception of suitably altering the constituents thereof corresponding to the configuration of the negative electrode in the resulting lithium ion secondary battery.

<Separator>

Prior to assembly, the separator has the desired configuration in the separator of the resulting lithium ion secondary battery.

<Cell Assembly>

The electrode body is composed using the above-mentioned positive electrode precursor, negative electrode and separator.

Thus, the electrode body in the present embodiment is:

an electrode body provided with a positive electrode precursor and a negative electrode, wherein the above-mentioned positive electrode precursor has a positive electrode current collector and a positive electrode active material layer provided on one side or both sides of the positive electrode current collector, the above-mentioned positive electrode active material layer contains a positive electrode active material and preferably further contains at least one type of alkaline metal atoms selected from the group consisting of Na atoms and K atoms as well as a lithium compound other than the positive electrode active material, the above-mentioned positive electrode active material contains a transition metal oxide capable of occluding and releasing lithium ions, the above-mentioned negative electrode has a negative electrode current collector and a negative electrode active material layer provided on one side or both sides of the negative electrode current collector, and the above-mentioned negative electrode active material layer, based on the total weight of the negative electrode active material layer, contains a carbon material at a ratio of 50 wt % to 95 wt % as the first negative electrode active material, and contains at least one type among silicon, silicon compounds, tin and tin compounds at a ratio of 5 wt % to 50 wt % as the second negative electrode active material.

In assembling the electrode body, a positive electrode terminal and a negative electrode terminal are connected to a laminate, obtained by laminating the positive electrode precursor and negative electrode, which have been cut into the shapes of sheets, with the separator interposed there between, to produce an electrode laminate. Alternatively, a positive electrode terminal and a negative electrode terminal are connected to wound body, obtained by winding the positive electrode precursor and negative electrode with the separator interposed there between, to produce an electrode wound body. The shape of the electrode wound body may be cylindrical or flat.

There are no particular limitations on the method used to connect the positive electrode terminal and negative electrode terminal, and connections can be carried out by a method such as resistance welding, ultrasonic welding or laser welding.

<Housing in Outer Casing>

A metal can or laminated package can be used for the outer casing. An aluminum can is preferable for the metal can. A film obtained by laminating metal foil and resin film is preferably for the laminated package, and an example thereof is a laminated package composed of three layers consisting of an outer layer resin film, metal foil and inner resin film. The outer layer resin film is for preventing the metal foil from being damaged by contact, and a nylon or polyester resin can be used preferably. The metal foil is for preventing permeation of moisture and gas, and copper, aluminum or stainless steel foil can be used preferably. The inner resin film is for protecting the metal foil from electrolyte housed inside and for providing a melt seal when heat-sealing the outer casing, and polyolefin or acid-modified polyolefin can be used preferably.

The dried electrode body is preferably housed in the outer casing and sealed while leaving an opening on one end. Although there are no particular limitations on the method used to seal the outer casing, in the case of using a laminated package, a method such as heat sealing or impulse sealing can be used.

<Drying (Optional Step)>

The electrode body housed in the outer casing is preferably removed of residua solvent by drying. Although there are no particular limitations on the drying method, the electrode body can be dried by vacuum drying. The amount of residual solvent based on the weight of the positive electrode active material layer or negative electrode active material layer is preferably 5 wt % or less. If the amount of residual solvent is greater than 5 wt %, solvent remains within the system resulting in poor self-discharge characteristics and cycle characteristics, thereby making this undesirable.

(2) Electrolyte Injection

Following assembly, a nonaqueous electrolyte is injected into the electrode body housed in the outer casing. Following injection, the electrode body is preferably further impregnated with the nonaqueous electrolyte to adequately immerse the positive electrode, negative electrode and separator in the nonaqueous electrolyte.

As was previously described, the positive electrode active material layer in the positive electrode of the lithium ion secondary battery of the present embodiment preferably contains at least one type selected from the group consisting of compound represented by the above-mentioned formulas (1)-(3).

As was additionally described, the method used to contain these compounds represented by formulas (1)-(3) in the positive electrode active material layer of the positive electrode is preferably a method consisting of containing a precursor capable of forming these compounds by decomposition in a nonaqueous electrolyte, decomposing the precursor when fabricating a lithium ion secondary battery, and accumulating these compounds in the positive electrode active material layer.

Examples of the precursor contained in the nonaqueous electrolyte that forms the compounds represented by formulas (1)-(3) by decomposition include at least one type of organic solvent selected from the group consisting of ethylene carbonate, propylene carbonate, butylene carbonate, vinylene carbonate and fluoroethylene carbonate, and preferably include ethylene carbonate and propylene carbonate.

Thus, the nonaqueous electrolyte used in the electrolyte injection step preferably contains these organic solvents.

In the state in which at least a portion of the positive electrode, negative electrode and separator are not immersed in the nonaqueous electrolyte, problems such as increased resistance or decreased durability of the resulting lithium ion secondary battery may occur since pre-doping does not proceed uniformly during pre-doping to be subsequently described. Thus, the positive electrode, negative electrode and separator are preferably all immersed in the nonaqueous electrolyte.

Although there are no particular limitations on the method used to realize this impregnated state, an example of a method that can be used consists of placing the electrode laminate in a decompression chamber with one end of the outer casing open after having injected the nonaqueous electrolyte, reducing the pressure inside the chamber using a vacuum pump, and then returning the inside of the chamber to atmospheric pressure. Following impregnation, the electrode laminate is sealed with one end of the outer casing open by sealing while reducing pressure.

(3) Pre-Doping

Next, a pre-doping step is carried out at an environmental temperature of 20° C. to 60° C.

In the present embodiment, the positive electrode active material containing lithium ions and the lithium compound other than the positive electrode active material functions as dopant sources of lithium ions supplied to the negative electrode active material. During pre-doping, the negative electrode active material layer is preferably doped with lithium ions by applying a voltage is applied between the positive electrode precursor and negative electrode, decomposing the lithium compound in the positive electrode precursor and releasing lithium ions, and reducing the lithium ions at the negative electrode.

The charge/discharge efficiency during initial charging and discharging of a negative electrode containing an alloy-based active material as a negative electrode active material is generally low. Consequently, an amount of lithium compound equivalent to the irreversible capacity of the negative electrode during initial charging and discharging is preferably contained in the positive electrode precursor.

Irreversible capacity of the negative electrode during initial charging and discharging can be determined according to the method indicated below.

A negative electrode prior to pre-doping is cut out to a certain area ($Z$ (cm$^2$)) for use as a working electrode, lithium metal is used for the counter electrode and reference electrode, respectively, and a nonaqueous solvent containing a lithium salt is used as electrolyte to fabricate an electrochemical cell. After carrying out constant current discharging on the above-mentioned electrochemical cell to a voltage value of 0.01 V at a current value of 0.5 mA/cm$^2$ in an environment at 25° C. using a charge/discharge device, constant voltage discharging is carried out to a current value of 0.01 mA/cm$^2$. The sum of the discharge capacities during this constant current discharging and constant voltage discharging is defined as $Q_{DG}$ (mAh). Continuing, constant current charging is carried out on the above-mentioned electrochemical cell to a voltage value of 2.00 V at a current value of 0.5 mA/cm$^2$. The charging capacity during this constant current charging is defined as $Q_{CG}$ (mAh). Irreversible capacity (mAh/cm$^2$) of the negative electrode can be calculated according to the formula $(Q_{DG}-Q_{CG})/Z$ using the resulting values of $Z$, $Q_{DG}$ and $Q_{CG}$.

Capacity of the lithium ion secondary battery can be increased by containing an amount of lithium compound equivalent to the above-mentioned irreversible capacity during initial charging and discharging of the negative electrode since the lithium compound that has decomposed during pre-doping is able to replenish irreversible capacity. In the case of using lithium carbonate for the lithium compound, since the theoretical capacity of lithium ions possessed by the lithium carbonate is 725 mAh/g, an amount of lithium carbonate equivalent to 0.5 times to 2.0 times the irreversible capacity of the negative electrode during initial charging and discharging is preferably contained in the positive electrode precursor.

In order to adjust the above-mentioned amount of lithium compound contained in the positive electrode precursor, the amount of lithium compound incorporated when preparing the slurry for forming the positive electrode precursor as previously described can be adjusted, and the amount of slurry coated onto the positive electrode current collector can be increased or decreased. In order to adjust the discharge capacity $Q_{DG}$ and charge capacity $Q_{CG}$ per unit area of the negative electrode, the type and amount of negative electrode active material used to fabricate the negative electrode can be suitably selected, and the amount of slurry coated onto the negative electrode current collector can be increased or decreased.

In the method for producing a lithium ion secondary battery of the present invention, the voltage applied between the positive electrode precursor and negative electrode during pre-doping is 4.2 V or more. This voltage is preferably 4.2-5.0 V and more preferably 4.3-4.9 V.

There are no particular limitations on the method used to apply voltage, and a method consisting of applying a constant voltage at a voltage of 4.2 V or more using a charge/discharge device or power supply, a method consisting of superimposing a pulsed voltage when applying a constant voltage of 4.2 V or more, or a method consisting of carrying out charge/discharge cycling over a voltage range that includes a voltage of 4.2 V or more using a charge/discharge device, can be used.

In the case of carrying out pre-doping by constant current, constant voltage charging, pre-doping can be judged to be completed at the point the current value during constant voltage charging reaches 0.3 times or less the current value during constant current charging. Although current flows as a result of decomposition of the lithium compound in the positive electrode precursor, current values attenuate due to a decrease in the amount of this lithium compound. Although an electrolyte decomposition reaction proceeds together with decomposition of the lithium compound as a result of applying a voltage of 4.2 V or more, by completing pre-doping at the point the current value has reached 0.3 times or less the current value during constant current charging, an adequate amount of lithium compound can be decomposed and decomposition of electrolyte, which constitutes a side reaction, can be inhibited.

The temperature of the lithium ion secondary battery during pre-doping is preferably adjusted to 20° C. to 60° C. If the temperature is 20° C. or higher, decomposition of the lithium compound is promoted and pre-doping can be carried out in a short period of time. If the temperature is 60° C. or lower, side reactions accompanying decomposition of the lithium compound can be inhibited.

In the pre-doping procedure, $CO_2$ and other gases are generated accompanying oxidative decomposition of the lithium compound in the positive electrode precursor (both the lithium compound contained in the positive electrode active material and the lithium compound other than the positive electrode active material). Consequently, it is preferable to devise a means for releasing the generated gas outside the outer casing when applying a voltage. Examples of such means include applying a voltage while providing an opening in a portion of the outer casing, and applying a voltage after having preliminarily installed a suitable outgassing means, such as a gas release valve or gas-permeable film, in a portion of the outer casing.

(Optional Step after Pre-Doping)

Aging is preferably carried out on the electrode body after pre-doping. Aging consists of decomposing the solvent in the nonaqueous electrolyte at the negative electrode and forming a lithium ion-permeable, solid polymer coating on the surface of the negative electrode.

There are no particular limitations on the aging method, and for example, a method can be used that consists of reacting the solvent in the electrolyte in a high-temperature environment.

Following aging, gas is preferably vented to reliably remove gas remaining in the electrolyte, positive electrode and negative electrode. Since ionic conductivity is inhibited in a state in which gas is remaining in at least a portion of the electrolyte, positive electrode and negative electrode, resistance of the resulting lithium ion secondary battery ends up increasing. There are no particular limitations on the method used to vent gas, and for example, a method consisting of placing the electrode precursor in a decompression chamber with the outer casing open followed by reducing the pressure inside the chamber using a vacuum pump can be used. After venting gas, the outer casing can be sealed by sealing the outer casing to produce a lithium ion secondary battery.

<<Lithium Ion Secondary Battery>>

A lithium ion secondary battery can be produced according to the method described above. In one embodiment thereof, this lithium ion secondary battery is provided with a positive electrode, which has a porous positive electrode active material layer having pores that are traces where a lithium compound contained in the positive electrode precursor has dissipated, and a negative electrode active material layer doped with lithium ions by using the lithium compound as a dopant source. The positive electrode may also contain a lithium compound that was not decomposed by pre-doping.

The positive electrode active material in the positive electrode active material layer contains a transition metal oxide containing Ni atoms. Here, the difference between energy of the Ni3p main peak and energy of the Ni3p sub-peak as measured by X-ray photoelectron spectroscopy (XPS) of the positive electrode active material layer when the voltage of the lithium ion secondary battery is 3.5 V is 4.9 eV to 6.1 eV. The Ni3p main peak is observed within the range of 67.0 eV to 70.0 eV and the sub-peak is observed within the range of 71.0 eV to 76.5 eV.

Ni atoms contained in the transition metal oxide form a fluorine compound such as $NiF_2$ by reacting with a fluorine-containing compound (typically a lithium salt containing fluorine atoms present in a nonaqueous electrolyte), and this is thought to form a passivation layer by accumulating on the surface of the positive electrode active material layer resulting in inactivation of the positive electrode active material layer. As a result, the difference between energy of the Ni3p main peak and energy of the sub-peak is thought to expand.

In the case the energy difference between both of these peaks is 4.9 eV or more, cycle characteristics of the lithium ion secondary battery are thought to improve since decomposition of electrolyte by the passivation layer formed on the surface of the positive electrode active material layer is inhibited. On the other hand, in the case the energy difference between both of the peaks is 6.1 eV or less, the passivation layer on the surface of the positive electrode active material layer does not become excessive, and decreases in capacity and output of the lithium ion secondary battery are thought to be inhibited.

The following indicates examples of methods used to make the difference between the energy of the Ni3p main peak and energy of the sub-peak, as measured by X-ray photoelectron spectroscopy (XPS) of the positive electrode active material layer when the voltage of the lithium ion secondary battery is 3.5 V, to be 4.9 eV to 6.1 eV in the lithium ion secondary battery of the present embodiment:

(1) method consisting of preliminarily reacting a transition metal oxide containing Ni atoms with a fluorine-containing compound (preferably a lithium salt containing fluorine atoms) followed by using the resulting reaction product to produce a positive electrode precursor; and (2) method consisting of assembling a lithium ion secondary battery, containing a transition metal oxide containing Ni atoms and lithium compound other than the positive electrode active material in the positive electrode active material layer, and containing a fluorine-containing compound (preferably a lithium salt containing fluorine atoms) in a nonaqueous electrolyte, followed by reacting the lithium compound other than the positive electrode active material with the fluorine-containing compound by a charge-discharge procedure, and reacting the generated fluorine ions with the transition metal oxide containing Ni atoms.

In the lithium ion secondary battery of the present embodiment, the relative concentration of F atoms as measured by XPS of the positive electrode active material layer when the voltage is 3.5 V is preferably 7.2 atomic % to 27.1 atomic %. This relative concentration of F atoms is preferably the relative concentration of fluorine (F1s) relative to the total of carbon (C1s), oxygen (O1s), lithium (Li1s), fluorine (F1s), nickel (Ni3p), cobalt (Co3p) and phosphorous (P2p) as measured by XPS.

F atoms in the positive electrode active material are thought to be present in the form of LiF formed in a reaction among the above-mentioned fluorine compound such as $NiF_2$, electrolyte and solvent. In the case the relative concentration of F atoms in the positive electrode active material is 7.2 atomic % or more, a passivation layer is suitably formed on the surface of the positive electrode active material layer. Since decomposition of electrolyte is inhibited as a result thereof, cycle characteristics of the lithium ion secondary battery are thought to improve. On the other hand, in the case the relative concentration of F atoms is 27.1 atomic % or less, the passivation layer is not excessively formed on the surface of the positive electrode active material layer and decreased capacity and output of the lithium ion secondary battery are thought to be inhibited.

The following indicates examples of methods used to adjust the relative concentration of F atoms, as measured by XPS of the positive electrode active material layer when the voltage is 3.5 V, to 7.2 atomic % to 27.1 atomic % in the lithium ion secondary battery of the present embodiment:

(1) method consisting of preliminarily mixing a fluorine-containing compound (preferably a lithium salt containing fluorine atoms) into a positive electrode coating solution followed by coating and drying to produce a positive electrode precursor; and (2) method consisting of assembling a lithium ion secondary battery, containing a lithium compound other than the positive electrode active material and containing a fluorine-containing compound (preferably a lithium salt containing fluorine atoms) in a nonaqueous electrolyte, followed by reacting the lithium compound other than the positive electrode active material with the fluorine-containing compound by a charge-discharge procedure, and reacting the generated fluorine ions with a transition metal oxide containing Ni atoms or reacting with lithium ions.

XPS of the positive electrode active material layer is measured by adequately cleaning and drying the positive electrode active material layer, after having adjusted the voltage of the lithium ion secondary battery of the present embodiment to 3.5 V, with a suitable solvent (typically, dimethyl carbonate (DMC)) and using for the measurement sample.

In the present embodiment, the negative electrode potential when the voltage of the lithium ion secondary battery is 2.5 V is preferably 0.3 V to 1.2 V. If the negative electrode potential is 0.3 V or more, precipitation of lithium metal on the negative electrode can be inhibited. If the negative electrode potential is 1.2 V or less, expansion and contraction of the negative electrode accompanying charging and discharging can be inhibited and cycling characteristics improve.

A preferable method for making the negative electrode potential 0.3 V to 1.2 V when the voltage of the lithium ion secondary battery is 2.5 V consists of containing an amount of lithium compound in the positive electrode precursor that is equivalent to irreversible capacity during initial charging and discharging as previously described and doping the negative electrode with lithium ions in the pre-doping step.

In the present embodiment, the relative concentration of Li atoms having a peak at 52.5 eV to 53.7 eV in the Li1s spectrum observed by X-ray photoelectron spectroscopy (XPS) of the negative electrode active material layer when the voltage of the lithium ion secondary battery is 3.5 V is 1.0 atomic % to 25.0 atomic %.

A peak at 52.5 eV to 53.7 eV in the Li1s spectrum is assigned to lithium metal, and a peak at 53.9 eV to 54.9 eV is assigned to a lithium compound (such as LiF or $Li_2CO_3$). In the case lithium metal is present, a satellite peak is characteristically observed in the vicinity of 61.0 eV in the XPS Li1s spectrum.

If the relative concentration of Li atoms having a peak at 52.5 eV to 53.7 eV in the Li1s spectrum is 1.0 atomic % or more, the negative electrode can be maintained at a low potential, and since expansion and contraction of the negative electrode active material layer accompanying charging and discharging can be inhibited, cycle characteristics of the lithium ion secondary battery improve. If the relative concentration of Li atoms having a peak at 52.5 eV to 53.7 eV is 25.0 atomic % or less, diffusion of lithium ions is promoted, thereby making it possible to increase output of the lithium ion secondary battery.

In the lithium ion secondary battery of the present embodiment, the relative concentration of F atoms as measured by XPS of the negative electrode active material layer when the voltage is 3.5 V is preferably 7.5 atomic % to 46.5 atomic %. This relative concentration of F atoms is the relative concentration of fluorine (F1s) relative to the total of carbon (C1s), oxygen (O1s), lithium (Li1s), fluorine (F1s), nickel (Ni3p), cobalt (Co3p) and phosphorous (P2p) measured by XPS.

F atoms in the negative electrode active material are thought to be present in the form of LiF formed in a reaction with electrolyte and solvent. In the case the relative concentration of F atoms in the negative electrode active material is 7.5 atomic % or more, a passivation layer is suitably formed on the surface of the negative electrode active material layer. Since decomposition of electrolyte is inhibited as a result thereof, cycle characteristics of the lithium ion secondary battery are thought to improve. On the other hand, in the case the relative concentration of F atoms is 46.5 atomic % or less, the passivation layer is not excessively formed on the surface of the positive negative active material layer and decreased capacity and output of the lithium ion secondary battery are thought to be inhibited.

The following indicates examples of methods used to adjust the relative concentration of F atoms, as measured by XPS of the negative electrode active material layer when the voltage is 3.5 V, to 7.5 atomic % to 46.5 atomic % in the lithium ion secondary battery of the present embodiment:

(1) method consisting of preliminarily mixing a fluorine-containing compound (preferably a lithium salt containing fluorine atoms) into a negative electrode coating solution followed by coating and drying to produce a negative electrode; and (2) method consisting of assembling a lithium ion secondary battery, containing a lithium compound other than the positive electrode active material in the positive electrode active material layer and containing a fluorine-containing compound (preferably a lithium salt containing fluorine atoms) in a nonaqueous electrolyte, followed by reacting the lithium compound other than the positive electrode active material with the fluorine-containing compound by a charge-discharge procedure, reacting the generated fluorine ions with lithium ions occluded in the negative electrode active material, and accumulating on the surface of the negative electrode active material layer.

XPS of the positive negative active material layer is measured by adequately cleaning and drying the negative electrode active material layer, after having adjusted the voltage of the lithium ion secondary battery of the present embodiment to 3.5 V, with a suitable solvent (typically, dimethyl carbonate (DMC)) and using for the measurement sample.

The volumetric energy density of the lithium ion secondary battery of the present embodiment is preferably 500 Wh/L to 1500 Wh/L.

<<Analysis of Various Parameters>>

<Degree of Dispersion>

Degree of dispersion in the present embodiment is the value determined by dispersion evaluation testing with a grind gauge as defined in JIS K5600. Namely, an adequate amount of sample is allowed to flow into the deep end of the grooves of a grind gauge having grooves of a desired depth corresponding to the size of the particles so as to slightly overflow from the grooves. Next, a scraper is placed so that the long end of the scraper is parallel to the widthwise direction of the gauge and the edge of the blade contacts the deep end of the grooves of the grind gauge, the scraper is dragged over the surface of the gauge for 1 to 2 seconds to the zero depth of the grooves at a uniform speed and at a right angle to the lengthwise direction of the grooves while holding the scraper so as to remain on the surface of the gauge, and the gauge is observed by shining a light at an angle of 20° to 30° within 3 seconds after completion of dragging followed by reading the depth at which particles appear in the grooves of the grind gauge.

<Viscosity (ηb) and Ti Values>

Viscosity (ηb) and Ti values in the present embodiment are values respectively determined according to the method indicated below. First, viscosity (ηa) is acquired once the value has stabilized after measuring for 2 minutes or more under conditions of a temperature of 25° C. and shear velocity of $2s^{-1}$ using an E-type viscometer. Next, viscosity (ηb) is acquired by measuring under the same conditions as described above with the exception of changing the shear velocity to 20 $s^{-1}$. Ti value is calculated according to the formula Ti value=ηa/ηb using the viscosity values obtained above. Shear viscosity may be increased in a single step from 2 $s^{-1}$ to 20 $s^{-1}$, may be increased incrementally over the above-mentioned range, or may be increased while suitably acquiring the viscosity value at that shear velocity.

<Identification of Lithium Compound in Positive Electrode or Positive Electrode Precursor>

There are no particular limitations on the method used to identify the lithium compound contained in the positive electrode or positive electrode precursor, and examples of methods that can be used to identify the lithium compound include micro Raman spectroscopy, energy dispersive X-ray analysis (SEM-EDX), ion chromatography, $^7$Li solid-state NMR, X-ray diffraction (XRD), time-of-flight secondary ion mass spectrometry (TOF-SIMS), Auger electron spectroscopy (AES), temperature-programmed desorption/mass spectrometry (TPD/MS) and differential scanning calorimetry (DSC). The lithium compound is preferably identified by combining a plurality of these analytical methods.

[Micro Raman Spectroscopy]

The positive electrode active material and lithium compound other than the positive electrode active material can be determined by Raman imaging of carbonate ions on the positive electrode surface measured an observation magnification factor of 1,000× to 4,000×. As an example of measurement conditions, measurement can be carried out under conditions of an excitation light wavelength of 532 nm, excitation light intensity of 1%, 50× objective lens having a long working distance, diffraction grating of 1800 gr/mm, mapping mode set to point scanning (slit: 65 mm, binning: 5 pix), 1 mm steps, exposure time per point of 3 seconds, one integration and noise filter activated. With respect to the measured Raman spectrum, although the straight baseline is set over a range of 1,071-1,104 cm-1 and area is calculated by using the positive value above the baseline as the peak of the carbonate ions followed by integrating the frequency, the area of carbonate ion mapping on the surface of the positive electrode active material layer is calculated by subtracting the frequency for the carbonate ion peak area, for which the noise component at this time is approximated with a Gaussian function, from the frequency distribution of carbonate ions.

[Energy Dispersive X-Ray Analysis (SEM-EDX)]

Atoms contained in the positive electrode or positive electrode precursor can be quantified by SEM-EDX of the surface thereof at an observation magnification factor of 1,000× to 4,000×. As a measurement example, SEM-EDX images can be measured at an acceleration voltage of 10 kV, emission current of 10 μm, number of measured pixels of 256×256 pixels and 50 for the number of integrations. In order to prevent the sample from becoming charged, the sample may be submitted for measurement after having carried out surface treatment such as vacuum deposition or sputtering of gold, platinum or osmium.

The following describes an example of a method for identifying a lithium compound by observing a cross-section of the positive electrode by SEM.

In the case the lithium compound is lithium carbonate, for example, the lithium carbonate can be determined by carbon mapping and oxygen mapping using SEM-EDX images of a cross-section of the positive electrode measured at an observation magnification factor of 1,000× to 4,000×. During measurement of the SEM-EDX images, luminance and contrast are preferably adjusted so there are no pixels reaching maximum luminance and the mean value of luminance is within the range of 40%-60%. When regions containing bright areas digitized based on the mean value of luminance at 50% or more for each of the resulting carbon mapping and oxygen mapping are designated as carbon regions and oxygen regions, respectively, the areas where these regions overlap can be determined to be lithium carbonate.

[Ion Chromatography]

Anion species that have eluted into water can be identified by rinsing the positive electrode or positive electrode precursor with distilled water and analyzing the water that has been rinsed off by ion chromatography. An ion exchange column, ion exclusion column or reversed-phase ion-pair column can be used for the column. An electrical conductivity detector, ultraviolet-visible absorption detector or electrochemical detector can be used for the detector, and a suppressor system equipped with a suppressor before the detector, or a non-suppressor system using a solution having low electrical conductivity for the eluent without installing a suppressor, can be used.

Since ion chromatography can be combined with a mass spectrometer or charged particle detector during measurement, ion chromatography is preferably combined with a suitable column and detector based on lithium compounds identified from the analysis results of SEM-EDX, Raman spectroscopy and XPS.

<Analysis of Lithium Compound in Positive Electrode or Positive Electrode Precursor>

The following provides a description of methods used to analyze a lithium compound contained in the positive electrode active material layer of the positive electrode or positive electrode precursor.

Lithium compounds can be quantified on the basis of changes in the weight of the positive electrode or positive electrode precursor before and after rinsing the positive electrode or positive electrode precursor with distilled water. Although there are no particular limitations on the area of the positive electrode or positive electrode precursor sample used for measurement, the area is preferably 5 cm² to 200 cm² and more preferably 25 cm² to 150 cm² from the viewpoint of reducing measurement variation. Measurement reproducibility is secured if the area is 5 cm² or more. Sample handling is superior if the area is 200 cm2 or less.

(Quantification of Lithium Compound)

The following provides a description of a specific method for determining the amount of a lithium compound and the mean particle diameter of a lithium compound using as an example the case a lithium compound in the positive electrode active material layer.

The weight of a cut positive electrode is defined as $M_0$ (g). Continuing, the positive electrode is adequately immersed for 3 days or longer in distilled water in an amount 100 times the weight of the positive electrode (100 $M_0$ (g)) to cause the lithium compound to elute into the water in an environment at 25° C. At this time, it is preferable to implement measures such as covering the container to prevent the distilled water from evaporating. After having immersed the positive electrode for 3 days or longer, the positive electrode is removed from the distilled water (and the amount of liquid is adjusted so that weight of the distilled water is 100 M0 (g) in the case of measuring by ion chromatography) and vacuum-dried. Vacuum drying conditions preferably consist of, for example, drying until the residual moisture in the positive electrode active material layer reaches 1 wt % or less at a temperature of 100-200° C., pressure of 0-10 kPa and time over a range of 5-20 hours. The amount of residual moisture can be quantified by the Karl Fischer method. After defining the weight of the positive electrode after vacuum-drying as $M_1$ (g), the positive electrode active material layer on the current collector is removed using a spatula, brush or whisk in order to measure the weight of the current collector of the resulting positive electrode. When the resulting weight of the positive electrode current collector is defined as $M_2$ (g), the amount of lithium compound contained in the positive electrode active material layer can be calculated using the equation indicated below.

Amount of lithium compound=
100×($M_0$−$M_1$)/($M_0$−$M_2$)

(Mean Particle Diameter of Lithium Compound)

Although there are no particular limitations thereon, the method used to measure mean particle diameter of a lithium compound, mean particle diameter can be calculated from a SEM image and SEM-EDX image of a cross-section of the positive electrode. A cross-section of the positive electrode can be formed using BIB processing in which an Ar beam is radiated from above the positive electrode followed by forming a smooth cross-section along the edge of a shielding plate placed directly on the sample. The mean particle diameter of the lithium compound can be determined by measuring at the same field as the above-mentioned SEM-EDX image of the positive electrode cross-section and analyzing the resulting image. A cross-sectional area S is determined for all particles of the lithium compound identified in SEM images of the positive electrode cross-section and particle diameter d is determined by calculating according to the equation indicated below.

$d=2\times(S/\pi)^{1/2}$

In the case the positive electrode contains lithium carbonate, the distribution of carbonate ions may be determined by measuring the positive electrode cross-section by Raman imaging.

<Analysis of Alkaline Metal Atoms>

The following provides an explanation of a technique for analyzing alkaline metal atoms by using as an example the case of analyzing alkaline metal atoms in the positive electrode active material layer in a positive electrode.

[X-Ray Photoelectron Spectroscopy (XPS)]

The bonding state of alkaline metal atoms can be determined by analyzing the electronic state using XPS. An example of measurement conditions consists of using monochromatic AlKα rays for the X-ray source, X-ray beam width of 100 μmϕ (25 W, 15 kV), path energy of 58.70 eV at narrow scan, charge neutralization on, 10 sweeps (carbon, oxygen), 20 sweeps (fluorine), 30 sweeps (phosphorous), 40 sweeps (alkaline metal atoms), 50 sweeps (silicon) at narrow scan, and energy steps of 0.25 eV each at narrow scan.

The surface of the positive electrode is preferably cleaned by sputtering prior to XPS measurement. An example of sputtering conditions used when cleaning the surface of the positive electrode consist of acceleration voltage of 1.0 kV and sputtering over a range of 2 mm×2 mm for 1 minute (1.25 nm/min as $SiO_2$).

The resulting XPS spectra can be assigned as indicated below according to electron binding energy.

TABLE 1

| Electron Shell | Binding Energy (eV) | Assignment |
|---|---|---|
| Li1s | 50~54 | $LiO_2$ or Li—C bond |
|  | 55~60 | LiF, $Li_2CO_3$, $Li_xPO_yF_z$ |
|  |  | (x, y, z are integers of 1-6) |
| C1s | 285 | C—C bond |
|  | 286 | C—O bond |
|  | 288 | COO |
|  | 290~292 | $CO_3^{2-}$, C—F bond |
| O1s | 527~530 | $O^{2-}(Li_2O)$ |
|  | 531~532 | CO, $CO_3$, OH, $PO_x$ |
|  |  | (x is an integer of 1-4). |
|  |  | $SiO_x$ (x is an integer of 1-4) |
|  | 533 | C—O, |
|  |  | $SiO_x$ (x is an integer of 1-4) |
| F1s | 685 | LiF |
|  | 687 | C—F bond, |
|  |  | $Li_xPO_yF_z$ |
|  |  | (x, y, z are integers of 1-6). |
|  |  | $PF_6^-$ |
| P2p | 133 | $PO_x$ (x is an integer of 1-4) |
|  | 134~136 | $PF_x$ (x is an integer of 1-6) |
| Si2P | 99 | Si, silicide |
|  | 101~107 | $Si_xO_y$ (x and y are arbitrary integers) |

With respect to the resulting spectra, in the case peaks overlap, spectra are preferably assigned after separating the peaks by assuming a Gaussian function or Lorentz function. Alkaline metal compounds that are present can be identified from the resulting electronic state measurement results and atomic abundance ratios.

[ICP-MS]

The positive electrode active material layer of a positive electrode is decomposed with a strong acid such as concentrated nitric acid, concentrated hydrochloric acid or aqua regia followed by diluting the resulting solution with pure water to an acid concentration of 2 wt % to 3 wt %. The decomposition with strong acid may be carried out by suitably applying heat and pressure. Although the resulting diluted solution is analyzed by ICP-MS, it is preferable to add a known amount of atoms as an internal standard at this time. In the case the alkaline metal atoms targeted for measurement are equal to or greater than the upper limit concentration of measurement, the diluted solution is preferably further diluted while maintaining acid concentration. Each atom can be quantified based on a calibration curve prepared in advance for the resulting measurement results using a standard solution for chemical analysis.

<Evaluation of Characteristics of Lithium Ion Secondary Battery>

The following indicates evaluations of the characteristics of the lithium ion secondary battery in the present embodiment. Since characteristics of the lithium ion secondary battery are such that the operating voltage changes depending on the combination of positive electrode active material and negative electrode active material, it is necessary to suitably alter the set values for charge and discharge voltages according to the types of positive electrode active material and negative electrode active material in the lithium ion secondary battery targeted for measurement.

Thus, the following examples of charge and discharge voltages used when evaluating characteristics are not particularly limited thereto.

[Discharge Capacity]

In the present description, capacity Q (Wh) is the value obtained according to the method indicated below.

First, constant current charging is carried out on a cell corresponding to a lithium ion secondary battery in a thermostatic chamber set to 25° C. at current value of 0.1 C to a voltage of 4.3 V, followed by carrying out constant voltage charging for 30 minutes by applying a constant voltage of 4.3 V. Subsequently, the electric capacity when constant current discharging is carried out to 2.5 V at a current value of 0.1 C is taken to be Q (Wh).

[Volume]

The volume of the lithium ion secondary battery refers to the volume of the portion in which the region of the electrode body where the positive electrode active material layer and negative electrode active material layer are laminated is housed by the outer casing.

For example, in the case of an electrode body housed by a laminated film, the region of the electrode body where the positive electrode active material layer and negative electrode active material layer are present is typically housed in a cup-shaped laminated film. The volume ($V_1$) of the lithium ion secondary battery in this case is calculated from the outer length ($l_1$) of this cup-shaped portion, the outer width ($w_1$) and the thickness ($t_1$) of the lithium ion secondary battery including the laminated film according to the equation $V_1 = l_1 \times w_1 \times t_1$.

In the case of an electrode laminate or electrode wound body housed in a rectangular metal can, the volume of the outer dimensions of the metal can is simply used as the volume of the lithium ion secondary battery. In other words, the volume ($V_2$) of this lithium ion secondary battery is calculated from the outer length ($l_2$), outer width ($w_2$) and outer thickness ($t_2$) of the rectangular metal can according to the equation $V_2 = l_2 \times w_2 \times t_2$.

In the case of an electrode wound by housed in a cylindrical metal can as well, the volume of the outer dimensions of the metal can is used as the volume of the lithium ion secondary battery. In other words, the volume ($V_3$) of this lithium ion secondary battery is calculated from the outer radius (r) of the bottom or top of the cylindrical metal can and the outer length ($l_3$) according to the equation $V_3 = 3.14 \times r \times r \times l_3$.

[Energy Density]

In the present description, energy density refers to the value obtained according to the equation $Q/V_i$ (Wh/L) using the electrical capacity Q and volume $V_i$ (i=1, 2, 3) of the lithium ion secondary battery including the lithium ion secondary battery.

[Internal Resistance]

In the present description, internal resistance Ra ($\Omega$) refers to the value obtained according to the method indicated below.

First, a cell corresponding to the lithium ion secondary battery is constant-current charged to 4.3 V in a thermostatic chamber set to 25° C. at a current value of 0.1 C followed by carrying out constant voltage charging for 30 minutes by applying a constant voltage of 4.3 V. Continuing, constant current discharging is carried out to 3.0 V at a current value of 3 C to obtain a discharge curve. When the voltage at discharge time=0 seconds, obtained by extrapolating from the values at 2 seconds and 4 seconds of the discharge time in this discharge curve by linear approximation, is taken to be $E_0$, the value calculated according to the equations: voltage drop $\Delta E = 4.3 - E_0$ and $Ra = \Delta E/(3C \text{ (current value A)})$ is taken to be internal resistance Ra ($\Omega$).

[Charge/Discharge Cycle Test]

In the present description, the rate of resistance increase (Rd/Ra) and capacity maintenance rate following a charge/discharge cycle test are measured according to the method indicated below.

First, a cell corresponding to the lithium ion secondary battery is constant-current charged to 4.3 V in a thermostatic chamber set to 25° C. at a current value of 1 C followed by carrying out constant voltage discharging to 3.0 V at a current value of 1 C. This charge/discharge procedure is repeated 100 times, internal resistance is measured before the start of testing and following completion of testing, and when internal resistance prior to the start of testing is defined as Ra ($\Omega$) and internal resistance following completion of testing is defined as Rb ($\Omega$), the rate of resistance increase after high-load charge/discharge cycle testing relative to before the start of testing is calculated according to Rb/Ra. The value obtained by dividing discharge capacity during the 100th cycle of charge/discharge cycle testing by discharge capacity during the 1st cycle is taken to be capacity maintenance.

EXAMPLES

The following indicates examples and comparative examples in embodiments of the present invention. However, the present invention is not limited in any way by the following examples and comparative examples.

<<Production and Evaluation of Positive Electrode Precursor>>

<Positive Electrode Precursor 1>

86.0 parts by weight of a powder represented by $LiNi_{0.82}Co_{0.14}Al_{0.04}O_2$ as a positive electrode active material, 3.0 parts by weight of acetylene black as a conductive filler, 6.0 parts by weight of lithium carbonate as a lithium compound other than the positive electrode active material, 0.005 parts by weight of lithium carbonate as an alkaline metal atom source, 4.995 parts by weight of polyvinylidene fluoride (PVdF) as a binder, and N-methylpyrrolidone (NMP) as an organic solvent were mixed to obtain a positive electrode slurry having a solid content concentration of 45 wt %. The resulting positive electrode slurry was coated and dried on both sides or one side of aluminum foil having a thickness of 15 μm as a positive electrode current collector followed by pressing to obtain Positive Electrode Precursor 1 (to be respectively referred to as "Single-sided Positive Electrode Precursor 1" or "Double-sided Positive Electrode Precursor 1", and collectively referred to as "Positive Electrode Precursor 1"). The thickness of the positive electrode active material of the Positive Electrode Precursor 1 was 55 μm per side, the basis weight of the positive electrode active material layer was 130 g/m² per side, and the bulk density of the positive electrode active material layer was 2.36 g/cc. Measurement of peel strength of the Positive Electrode Precursor 1 according to method previously described yielded a value of 0.23 N/cm. Quantification of the concentration of sodium atoms in the positive electrode active material layer of the Positive Electrode Precursor 1 as determined by the above-mentioned ICP-MS yielded a value of 52 ppm.

(Calculation of Area Ratio A of Carbonate Ion Mapping in Image of Micro Raman Spectroscopy)

(Sample Preparation)

A small piece measuring 1 cm×1 cm was cut out from the Positive Electrode Precursor 1 for use as a sample for measurement of the surface of the positive electrode precursor by micro Raman spectroscopy.

(Measurement)

Carbonate ion mapping was carried out using the inVia Reflex Micro Raman Spectroscopy System of Renishaw plc. The wavelength of the excitation light laser was set to 532 nm, a 50× objective lens having a long working distance was used, and light was focused at the location of the sample at a power level of about 0.7 mW. The widthwise direction of the sample surface of the Positive Electrode Precursor 1 was point-scanned over a range of 90 μm and the thickness and vertical directions were point-scanned over a range of 30 μm at 1 μm intervals to obtain a Raman spectrum for each measurement point.

Peak areas were respectively calculated for the positive area appearing in the region above the baseline and the negative area appearing below the baseline by drawing a straight baseline from 1,071 cm$^{-1}$ to 1,104 cm$^{-1}$ for the peak attributable to carbonate ions observed at 1,086 cm$^{-1}$ in the Raman spectra. At this time, the sign of the area appearing in the negative region below the baseline was designated as negative. An image of the carbonate ions was obtained by depicting as a spatial distribution of the peak area of carbonate ions.

(Calculation of Area Ratio A of Carbonate Ion Mapping)

Area ratio A of carbonate ion mapping of the surface of Positive Electrode Precursor 1 was calculated in the manner indicated below.

A straight baseline was set at the two locations of 1,071 cm$^{-1}$ and 1,104 cm$^{-1}$ in the 2,700 Raman spectra obtained at each measurement location on the surface of the sample of Positive Electrode Precursor 1, and the area of the portion above the baseline was designated as positive while the area of the portion below the baseline was designated as negative to generate mapping data of area (a). Continuing, a histogram was generated by dividing the maximum value to the minimum value of area (a) into 100 sections, fitting according to the least squares method was carried out using a Gaussian function on the portion on the negative side of the area value yielding the maximum frequency, and the noise component was approximated with a Gaussian function. The difference obtained by subtracting the Gaussian function fit from the original histogram was taken to be the histogram of the peak area of $CO_3^{2-}$. When the cumulative frequency of area (b) or more yielding maximum frequency was determined as the mapping frequency of $CO_3^{2-}$ ions, the cumulative frequency was determined to be 123. The area ratio A of carbonate ion mapping was then calculated by dividing this by the overall frequency of 2,700. The result was A=4.56%. Since the concentration Y of lithium compound other than the active material contained in the positive electrode active material layer of the Positive Electrode Precursor 1 was 6.0 wt %, A/Y was 0.76.

<Positive Electrode Precursors 2-22>

Positive Electrode Precursors 2-22 were produced and subjected to various evaluations according to the same methods as Positive Electrode Precursor 1 with the exception of respectively changing the type and amount (wt %) of positive electrode active material and used amounts (wt %) of acetylene black, lithium carbonate, sodium carbonate and polyvinylidene fluoride (PVdF) as shown in Table 1. The amounts (wt %) of these components shown in Table 1 are the values based on a value of 100 wt % for the total solid content in the positive electrode slurry.

The evaluation results are also shown in Table 1.

TABLE 1

| Positive Electrode Precursor | Positive Electrode Active Material | | Amounts of Other Components (wt %) | | | |
|---|---|---|---|---|---|---|
| | Type | Amount (wt %) | Acetylene black | Lithium carbonate | Sodium carbonate | PVdF |
| Precursor 1 | Ni0.82Co0.14Al0.04O2 | 86.0% | 3.0% | 6.0% | 0.005% | 4.995% |
| Precursor 2 | Ni0.82Co0.14Al0.04O2 | 86.0% | 3.0% | 6.0% | 0.001% | 4.999% |
| Precursor 3 | Ni0.82Co0.14Al0.04O2 | 84.0% | 3.0% | 6.0% | 0.0001% | 6.9999% |
| Precursor 4 | Ni0.82Co0.14Al0.04O2 | 88.0% | 3.0% | 6.0% | 0.0001% | 2.9999% |
| Precursor 5 | Ni0.82Co0.14Al0.04O2 | 88.0% | 3.0% | 6.0% | 0.04% | 2.96% |
| Precursor 6 | Ni0.82Co0.14Al0.04O2 | 83.0% | 3.0% | 9.0% | 0.001% | 4.999% |
| Precursor 7 | Ni0.82Co0.14Al0.04O2 | 88.0% | 3.0% | 4.0% | 0.001% | 4.999% |
| Precursor 8 | Ni0.82Co0.14Al0.04O2 | 88.0% | 3.0% | 1.5% | 0.001% | 7.499% |

TABLE 1-continued

| | | | | | | |
|---|---|---|---|---|---|---|
| Precursor 9 | Ni0.8Co0.1Mn0.1O2 | 86.0% | 3.0% | 6.0% | 0.005% | 4.995% |
| Precursor 10 | Ni0.82Co0.14Al0.04O2 | 86.0% | 3.0% | 9.0% | 0.005% | 1.995% |
| Precursor 11 | Ni0.82Co0.14Al0.04O2 | 90.0% | 5.0% | 3.5% | 0.005% | 1.495% |
| Precursor 12 | Ni0.82Co0.14Al0.04O2 | 87.0% | 5.0% | 3.5% | — | 4.5% |
| Precursor 13 | Ni0.82Co0.14Al0.04O2 | 90.0% | 5.0% | 0.5% | — | 4.5% |
| Precursor 14 | Ni0.82Co0.14Al0.04O2 | 76.0% | 3.0% | 16.0% | 0.07% | 4.93% |
| Precursor 15 | Ni0.82Co0.14Al0.04O2 | 81.0% | 3.0% | 6.0% | 0.08% | 9.92% |
| Precursor 16 | Ni0.82Co0.14Al0.04O2 | 82.0% | 3.0% | 10.0% | 0.03% | 4.97% |
| Precursor 17 | Ni0.82Co0.14Al0.04O2 | 90.0% | 5.0% | — | — | 5.0% |
| Precursor 18 | Ni0.82Co0.14Al0.04O2 | 78.0% | 3.0% | 14.0% | 0.0005% | 4.9995% |
| Precursor 19 | Ni0.82Co0.14Al0.04O2 | 90.0% | 5.0% | — | — | 5.0% |
| Precursor 20 | Ni0.82Co0.14Al0.04O2 | 75.0% | 3.0% | 17.0% | 0.05% | 4.95% |
| Precursor 21 | Ni0.82Co0.14Al0.04O2 | 88.0% | 4.0% | 3.0% | 0.05% | 4.95% |
| Precursor 22 | Ni0.82Co0.14Al0.04O2 | 90.0% | 5.0% | — | — | 5.0% |

| | | Evaluation Results | | | |
|---|---|---|---|---|---|
| Positive Electrode Precursor | Basis Weight of Positive Electrode Active Material Layer | Alkaline metal atom concentration (ppm) | Peel strength of positive electrode precursor (N/cm) | Carbonate ion mapping area ratio A (%) | A/Y |
| Precursor 1 | 130 | 52 | 0.23 | 4.56% | 0.76 |
| Precursor 2 | 129 | 7 | 0.25 | 4.89% | 0.81 |
| Precursor 3 | 133 | 2 | 1.75 | 5.11% | 0.85 |
| Precursor 4 | 128 | 1 | 0.02 | 4.81% | 0.80 |
| Precursor 5 | 130 | 440 | 0.02 | 4.26% | 0.71 |
| Precursor 6 | 135 | 12 | 0.22 | 13.19% | 1.47 |
| Precursor 7 | 130 | 11 | 0.26 | 2.37% | 0.59 |
| Precursor 8 | 130 | 10 | 1.93 | 1.59% | 1.06 |
| Precursor 9 | 131 | 47 | 0.22 | 4.70% | 0.78 |
| Precursor 10 | 130 | 50 | 0.0006 | 14.30% | 1.59 |
| Precursor 11 | 117 | 52 | 0.0004 | 1.48% | 0.42 |
| Precursor 12 | 130 | 0 | 0.22 | 2.81% | 0.80 |
| Precursor 13 | 122 | 0 | 0.25 | 0.19% | 0.37 |
| Precursor 14 | 130 | 679 | 0.23 | 34.44% | 2.15 |
| Precursor 15 | 130 | 789 | 2.31 | 4.41% | 0.73 |
| Precursor 16 | 145 | 328 | 0.26 | 7.78% | 0.78 |
| Precursor 17 | 140 | 0 | 0.24 | 0.00% | — |
| Precursor 18 | 150 | 4 | 0.24 | 27.19% | 1.94 |
| Precursor 19 | 144 | 0.00 | 0.21 | 0.00% | — |
| Precursor 20 | 152 | 3.00 | 0.24 | 35.00% | 2.06 |
| Precursor 21 | 120 | 4.00 | 0.23 | 1.67% | 0.56 |
| Precursor 22 | 117 | 0.00 | 0.21 | 0.00% | — |

<<Production and Evaluation of Negative Electrode>>
<Negative Electrode 1>

75.0 parts by weight of artificial graphite as a first negative electrode active material, 15.0 parts by weight of silicon oxide (SiO) as a second negative electrode active material, 3.0 parts by weight of acetylene black as a conductive filler, 7.0 parts by weight of polyvinylidene fluoride (PVdF) as a binder and N-methylpyrrolidone (NMP) were mixed to obtain a negative electrode slurry. The resulting negative electrode slurry was coated and dried on both sides of electrolytic copper foil having a thickness of 10 μm as a negative electrode current collector followed by pressing to obtain Negative Electrode 1. The thickness of the negative electrode active material layer in the resulting Negative Electrode 1 per side was 30 μm, the basis weight of the negative electrode active material layer was 40 g/m², and the bulk density was 1.33 g/cc.

(Measurement of Irreversible Capacity)

The resulting Negative Electrode 1 was cut out to a size of 5.1 cm×10.1 cm, the negative electrode active material layer on one side was removed using a spatula or brush, and measurement of irreversible capacity during initial charging and discharging of the Negative Electrode 1 according to the previously described method yielded a value of 0.48 mAh/cm².

<Negative Electrodes 2-14>

Negative Electrodes 2-14 were produced according to the same method as Negative Electrode 1 with the exception of respectively changing the type and amount of the second negative electrode active material and used amounts (wt %) of artificial graphite, acetylene black and PVdF as shown in Table 2. The amounts of the components shown in Table 2 are the values based on a value of 100 wt % for the total solid content in the negative electrode slurry.

Irreversible capacity was measured for each of the resulting negative electrodes in the same manner as Negative Electrode 1. The results are also shown in Table 2.

TABLE 2

|  | First Negative Electrode Active Material: Artificial Graphite (wt %) | Second Negative Electrode Active Material | | Amounts of Other Components (wt %) | | Negative Electrode Active Material Layer | | | |
|---|---|---|---|---|---|---|---|---|---|
|  |  | Type | Amount (wt %) | Acetylene black | PVdF | Basis weight (g/m$^2$) | Thickness (μm) | Bulk density (g/cc) | Irreversible Capacity (mAh/cm$^2$) |
| Negative Electrode 1 | 75.0% | SiO | 15.0% | 3.0% | 7.0% | 40 | 30 | 1.33 | 0.48 |
| Negative Electrode 2 | 60.0% | SiO | 30.0% | 3.0% | 7.0% | 35 | 26 | 1.35 | 0.84 |
| Negative Electrode 3 | 45.0% | SiO | 45.0% | 3.0% | 7.0% | 31 | 23 | 1.35 | 1.11 |
| Negative Electrode 4 | 30.0% | SiO | 60.0% | 3.0% | 7.0% | 30 | 22 | 1.36 | 1.44 |
| Negative Electrode 5 | 85.0% | SiO | 5.0% | 3.0% | 7.0% | 45 | 35 | 1.29 | 0.18 |
| Negative Electrode 6 | 90.0% | — | — | 3.0% | 7.0% | 45 | 35 | 1.29 | 0.058 |
| Negative Electrode 7 | 75.0% | Si | 15.0% | 3.0% | 7.0% | 38 | 28 | 1.36 | 0.58 |
| Negative Electrode 8 | 38.0% | SiO | 52.0% | 3.0% | 7.0% | 31 | 23 | 1.35 | 1.24 |
| Negative Electrode 9 | 75.0% | SnO$_2$ | 15.0% | 3.0% | 7.0% | 39 | 28 | 1.39 | 0.50 |
| Negative Electrode 10 | 45.0% | SnO$_2$ | 45.0% | 3.0% | 7.0% | 31 | 24 | 1.29 | 1.08 |
| Negative Electrode 11 | 38.0% | SnO$_2$ | 52.0% | 3.0% | 7.0% | 30 | 23 | 1.30 | 1.32 |
| Negative Electrode 12 | 75.0% | Sn | 15.0% | 3.0% | 7.0% | 40 | 29 | 1.38 | 0.48 |
| Negative Electrode 13 | 45.0% | Sn | 45.0% | 3.0% | 7.0% | 32 | 24 | 1.33 | 1.09 |
| Negative Electrode 14 | 38.0% | Sn | 52.0% | 3.0% | 7.0% | 31 | 23 | 1.35 | 1.35 |

In Table 2, the abbreviations used in the column entitled "Second Negative Electrode Active Material" respectively have the meanings indicated below.
SiO: Silicon oxide
Si: Silicon
SnO$_2$: Tin dioxide
Sn: Tin Example 1

(Assembly of Electrode Body)
Single-sided Positive Electrode Precursor 1 was cut into two sheets of a size of 5.0 cm×10.0 cm, Double-sided Positive Electrode Precursor 1 was cut into 4 sheets of a size of 5.0 cm×10.0 cm, and Negative Electrode 1 was cut into 5 sheets of a size of 5.1 cm×10.1 cm. Using a microporous film having a thickness of 15 μm as a separator, Single-sided Positive Electrode Precursor 1, separator, Negative Electrode 1, separator, Double-sided Positive Electrode Precursor 1 and separator were laminated in that order so that the outermost layer was the Single-sided Positive Electrode Precursor 1. Subsequently, a negative electrode terminal and positive electrode terminal were respectively connected to Negative Electrode 1 and Positive Electrode Precursor 1 by ultrasonic welding to obtain an electrode body. This electrode body was housed is an outer casing composed of an aluminum laminated package, and the three components consisting of the electrode terminals and bottom on the perimeter of the electrode body were heat-sealed under conditions of a sealing temperature of 180° C., sealing time of 20 sec and sealing pressure of 1.0 MPa. This was then vacuum-dried under conditions of a temperature of 70° C., pressure of 50 Pa and drying time of 60 hr.

(Confirmation of Cell Design)
The irreversible capacity during initial charging and discharging measured for Negative Electrode 1 was 0.48 mAh/cm$^2$. Since the total area of the Negative Electrode 1 of the electrode body fabricated in the manner described above is 515 cm$^2$ (5.1 cm×10.1×5 sheets×2 sides front and back), the irreversible capacity of the negative electrode in the above-mentioned electrode body can be calculated to be 247 mAh.

Since the theoretical capacity of lithium ions possessed by lithium carbonate is 725 mAh/g, the theoretical capacity of lithium ions derived from lithium carbonate present in the electrode body fabricated in the manner described above can be calculated to be 283 mAh. In other words, an amount of lithium carbonate equivalent to 1.14 times the irreversible capacity of the above-mentioned Negative Electrode 1 during initial charging and discharging is contained in the Positive Electrode Precursor 1.

(Preparation of Nonaqueous Electrolyte)
A solution obtained by dissolving LiPF$_6$ to a concentration of 1.2 mol/L using a mixed solvent of ethylene carbonate (EC) and methyl ethyl carbonate (EMC) at a ratio of 33:67 (volume ratio) followed by adding LiPO$_2$F$_2$ at 0.010 wt % was used as a nonaqueous electrolyte.

(Injection, Impregnation and Sealing>
Approximately 10 g of the above-mentioned nonaqueous electrolyte was injected into an electrode body housed in an aluminum laminated package under atmospheric pressure in a dry air environment at a temperature of 25° C. and dew point of −40° C. or lower. Continuing, the electrode body was placed in a decompression chamber and the pressure was reduced from atmospheric pressure to −95 kPa to impregnate the electrode body with the nonaqueous electrolyte.

Subsequently, the electrode laminate impregnated with nonaqueous electrolyte housed in the aluminum laminated package was placed in a vacuum sealing machine followed by sealing the aluminum laminated package for 10 seconds at 180° C. and pressure of 0.1 MPa with the pressure reduced to −95 kPa to fabricate a total of 10 lithium ion secondary batteries.

(Pre-Doping)

After carrying out constant current charging on the resulting lithium ion secondary batteries to a voltage of 4.5 V at a current value of 0.2 A in an environment at 45° C. using a charge/discharge device (TOSCAT-3100U) manufactured by Toyo System Co., Ltd., constant voltage charging was carried out at 4.5 V until the current value reached 0.01 A to carry out pre-doping of the negative electrode.

(Aging)

After carrying out constant current discharging on the pre-doped lithium ion secondary batteries to a voltage of 3.0 V at 0.2 A in an environment at 25° C., constant current discharging was carried out at 3.0 V for 1 hour to adjust the voltage to 3.0 V. Continuing, aging was carried out by storing the lithium ion secondary batteries in a thermostatic chamber at 60° C. for 5 hours.

(Degassing)

A portion of the aluminum laminated package of the aged lithium ion secondary batteries was opened in a dry air environment at a temperature of 25° C. and dew point of −40° C. Continuing, the above-mentioned lithium ion secondary batteries were placed in a decompression chamber, and after reducing pressure from atmospheric pressure to −80 kPa over the course of 3 minutes, the pressure was returned to atmospheric pressure over the course of 3 minutes and this procedure was repeated a total of 3 times. Subsequently, the lithium ion secondary batteries were placed in a vacuum sealing machine and after reducing the pressure to −90 kPa, the aluminum laminated package was sealed by sealing for 10 seconds at 200° C. and pressure of 0.1 MPa.

(Measurement of Short Circuit Rate)

The resulting lithium ion secondary batteries were constant-current charged until the voltage reached 4.3 V at a current value of 0.1 C in a thermostatic chamber set to 25° C. using charge/discharge device (ACD-01) manufactured by Aska Electronics Co., Ltd. followed by carrying out constant voltage charging by a applying a constant voltage of 4.3 V for a total of 1 hour. Subsequently, the lithium ion secondary batteries were pressurized at 100 kPa and allowed to stand undisturbed for 1 week in a thermostatic chamber at 25° C. The batteries were judged to have a micro-short circuit if the cell voltage 1 week later was less than 4.0 V. None of the 10 lithium ion secondary batteries fabricated in Example 1 were judged to have micro-short circuits and the short circuit rate was 0%.

(Quantification of Compounds (1)-(3) Contained in Positive Electrode Active Material Layer)

After adjusting one of the resulting lithium ion secondary batteries to a voltage of 3.5 V, the battery was disassembled in an argon (Ar) box installed in a room at 23° C. and controlled at a dew point of −90° C. or lower and oxygen concentration of 1 ppm or less followed by removing the positive electrode. After immersing and cleaning the removed positive electrode with dimethyl carbonate (DMC), the positive electrode was vacuum-dried for 10 hours at a pressure of 100 kPa in a side box while keeping the positive electrode from being exposed to the atmosphere.

The battery voltage was adjusted to 3.5 V according to the procedure indicated below.

(1) Constant voltage charging at 4.2 V was continued for 30 minutes following constant current charging to 4.2 V at a current value of 0.2 C.

(2) Next, constant voltage charging at 3.5 V was continued for 30 minutes following constant current discharging to 3.5 V at a current value of 0.2 C.

The positive electrode was cleaned with DMC according to the procedure indicated below.

(1) The positive electrode was immersed in DMC in an amount equal to 50 times the weight of the positive electrode followed by cleaning by allowing to stand undisturbed for 5 minutes.

(2) After 5 minutes, the DMC used for cleaning was discarded and the cleaned positive electrode was immersed in fresh DMC in an amount equal to 50 times the weight of the positive electrode followed by further cleaning by allowing to stand undisturbed for 5 minutes.

(3) The above step (2) was repeated to carry out cleaning a total of 5 times.

After drying, the positive electrode was transferred from the side box to an Ar box while keeping the positive electrode from being exposed to the atmosphere and then immersed in an extracted with heavy water to obtain a positive electrode extract. The extract was analyzed by (i) ion chromatography (IC) and (ii) $^1$H-NMR, and the amount of each component that accumulated on the positive electrode per unit weight of the positive electrode active material layer (mol/g) was determined from the concentration B (mol/ml) of each compound in the analyzed positive electrode extract, the volume (C) of heavy water used in extraction, and the weight (D) of the positive electrode active material layer used in extraction according to the following equation (3).

$$\text{Amount present per unit weight (mol/g)}=B\times C\div D \qquad (3)$$

The weight of the positive electrode active material used in extraction was determined according to the following method. The positive electrode active material layer was stripped from the current collector of the positive electrode body remaining after extracting with heavy water, and the stripped positive electrode active material layer was rinsed with water and vacuum-dried. Following rinsing and vacuum-drying, the positive electrode active material layer was cleaned with NMP or DMF. Continuing, after having vacuum-dried the resulting positive electrode active material layer again, the weight of the positive electrode active material layer used in extraction was investigated by weighing.

$^1$H-NMR was carried out according to the method indicated below.

The positive electrode extract was placed in a 3 mmϕ NMR tube (PN-002 manufactured by Shigemi Co., Ltd. and inserted into 5 mmϕ NMR tube (N-5 manufactured by Nihon Seimitsu Kagaku Co., Ltd.) filled with deuterated chloroform containing 1,2,4,5-tetrafluorobenzene followed by carrying out $^1$H-NMR measurement according to the double tube method. The integration value of each observed compound was determined by standardizing with the 7.1 ppm (m, 2H) signal of 1,2,4,5-tetrafluorobenzene.

Deuterated chloroform containing a known concentration of dimethylsulfoxide was placed in a 3 mmϕ NMR tube (PN-002 manufactured by Shigemi Co., Ltd.) and inserted into the same 5 mmϕ NMR tube (N-5 manufactured by Nihon Seimitsu Kagaku Co., Ltd.) filled with deuterated chloroform containing 1,2,4,5-tetrafluorobenzene followed by carrying out $^1$H-NMR measurement according to the double tube method. The integration value of the 2.6 ppm signal (s, 6H) of dimethylsulfoxide was determined by standardizing with the 7.1 ppm signal (m, 2H) of 1,2,4,5-tetrafluorobenzene in the same manner as described above. The concentration B of each compound in the positive electrode extract was determined from the relationship between the concentration of dimethylsulfoxide used and the integration value.

The $^1$H-NMR spectra were assigned as indicated below.
[With respect to XOCH$_2$CH$_2$OX]
CH$_2$ of XOCH$_2$CH$_2$OX: 3.7 ppm (s, 4H)
CH$_3$OX: 3.3 ppm (s, 3H)
CH$_3$ of CH$_3$CH$_2$OX: 1.2 ppm (t, 3H)
CH$_2$O of CH$_3$CH$_2$OX: 3.7 ppm (q, 2H)

As was previously described, since the signal assigned to CH$_2$ of XOCH$_2$CH$_2$OX (3.7 ppm) ends up overlapping with the signal assigned to CH$_2$O of CH$_3$CH$_2$OX (1.2 ppm), the amounts of the compounds represented by formulas (1)-(3) were calculated by subtracting the calculated portion equivalent to CH$_2$O of CH$_3$CH$_2$OX from the signal assigned to CH$_3$ of CH$_3$CH$_2$OX.

In the above description, X respectively represents —Li, —COOLi, —R$^1$ or —COOR$^1$ (wherein, R$^1$ represents an alkyl group having 1 to 4 carbon atoms or a halogenated alkyl group having 1 to 4 carbon atoms).

The amounts present of the compounds represented by formulas (1)-(3) contained in the positive electrode active material layer were calculated from the concentration of each compound in the extract as determined by the above-mentioned analyses of (i) and (ii), the volume of heavy water used in extraction, and the weight of the positive electrode active material used in extraction, and those amounts are summarized in Table 3.

(X-ray Photoelectron Spectroscopy)

After adjusting one of the resulting lithium ion secondary batteries to a voltage of 3.5 V, the battery was disassembled in an argon (Ar) box installed in a room at 23° C. and controlled at a dew point of −90° C. or lower and oxygen concentration of 1 ppm or less followed by removing the positive electrode and negative electrode. After respectively immersing and cleaning the removed positive electrode and negative electrode with dimethyl carbonate (DMC), the positive electrode and negative electrode were vacuum-dried for 10 hours at a pressure of 100 kPa in a side box while keeping the electrodes from being exposed to the atmosphere.

The battery voltage was adjusted to 3.5 V according to the procedure indicated below.

(1) Constant voltage charging at 4.2 V was continued for 30 minutes following constant current charging to 4.2 V at a current value of 0.2 C.
(2) Next, constant voltage charging at 3.5 V was continued for 30 minutes following constant current discharging to 3.5 V at a current value of 0.2 C.

The positive electrode and negative electrode were cleaned with DMC according to the procedure indicated below.

(1) The positive electrode and negative electrode were immersed in DMC in an amount equal to 50 times the weight of the positive electrode or negative electrode followed by cleaning by allowing to stand undisturbed for 5 minutes.
(2) After 5 minutes, the DMC used for cleaning was discarded and the cleaned positive electrode or negative electrode was immersed in fresh DMC in an amount equal to 50 times the weight of the positive electrode or negative electrode followed by further cleaning by allowing to stand undisturbed for 5 minutes.
(3) The above step (2) was repeated to carry out cleaning a total of 5 times.

Each active material layer of the positive electrode and negative electrode dried in the manner described above was measured by XPS under the conditions indicated below while keeping the electrodes from being exposed to the atmosphere.

1Instrument used: Scanning X-ray Photoelectron Spectrometer, Model PHI VersaProbe II, Ulvac Corp.
Excitation source: Monochromatic AlKα, 20 kV×5 mA (100 W)
Analysis size: 100 μm×1.4 mm
Photoelectron take-off angle: 45°
Capture Area:
  Survey scan: 0-1100 eV
  Narrow scan: Li1s (Ni3p, Co3p), O1s, F1s, Si2p, P2p, C1s
Pass Energy:
  Survey scan: 117.4 eV
  Narrow scan: 46.95 eV The measurement results for the difference between main peak energy and sub-peak energy of Ni3p (Ni3p energy difference, eV) and the relative concentration of F atoms having a peak at 682 eV to 690 eV in the F1s spectrum, as observed by XPS of the positive electrode active material layer, and the relative concentration of Li atoms ("lithium metal relative concentration", atomic %) having a peak at 52.5 eV to 53.7 eV in the Li1s spectrum and the relative concentration of F atoms (atomic %) having a peak at 682 eV to 690 eV in the F1s spectrum, as observed by XPS of the negative electrode active material layer, are summarized in Table 3.

(Measurement of Discharge Capacity)

Constant current charging was carried out on one of the resulting lithium ion secondary batteries until the voltage reached 4.3 V at 0.1 C in a thermostatic chamber set to 25° C. using a charge/discharge device (ACD-01) manufactured by Aska Electronics Co., Ltd. followed by carrying out constant voltage charging by applying a voltage of 4.3 V for a total of 1 hour. Discharge capacity and energy density when constant current discharging was subsequently carried out to 2.5 V at 0.1 C are summarized in Table 3.

(Calculation of Internal Resistance)

The above-mentioned lithium ion secondary battery following measurement of discharge capacity was constant-current charged until the voltage reached 4.3 V at a current value of 0.1 C in a thermostatic chamber set to 25° C. using a charge/discharge device (ACD-01) manufactured by Aska Electronics Co., Ltd. followed by carrying out constant voltage charging by applying a voltage of 4.3 V for a total of 1 hour, and further carrying out constant current discharging to 2.5 V at a current value of 3 C to obtain a discharge curve (time-voltage). Internal resistance Ra (Ω) was calculated according to the equations: voltage drop $\Delta E = 4.3 - E_0$ and $Ra = \Delta E/(3C$ (current value A)) by taking the voltage at discharge time=0 seconds, obtained by extrapolating from the values at 2 seconds and 4 seconds of the discharge time in this discharge curve by linear approximation, to be $E_0$. Internal resistance at 25° C. is summarized in Table 3.

(Charge/Discharge Cycle Test)

The rate of resistance increase (Rb/Ra) and capacity maintenance rate after charge/discharge cycle testing according to the previously described method were measured for the above-mentioned lithium ion secondary batteries in a thermostatic chamber set to 25° C. using a charge/discharge device (ACD-01) manufactured by Aska Electronics Co., Ltd., and are summarized in Table 3.

<Measurement of Negative Electrode Potential>

Constant current discharge was carried out on one of the resulting lithium ion secondary batteries until the voltage reached 2.5 V at a current value of 0.1 C in a thermostatic chamber set to 25° C. using a charge/discharge device (ACD-01) manufactured by Aska Electronics Co., Ltd. The above-mentioned lithium ion secondary battery was disassembled in an Ar box followed by removal of the negative electrode and positive electrode. The result of measuring the potential of the resulting negative electrode using lithium metal as a reference electrode are summarized in Table 3.

(Measurement of Positive Electrode Peel Strength)

After cleaning the above-mentioned positive electrode removed after disassembly twice using ethyl methyl carbonate in an Ar box, the positive electrode was vacuum-dried in a side box while keeping the positive electrode from being exposed to the atmosphere. Subsequently, the positive electrode was removed and exposed to the atmosphere followed by measuring peel strength according to the method previously described, the results of which are summarized in Table 3.

(Measurement of Alkaline Metal Atom Concentration in Positive Electrode)

The results of measuring the concentration of alkaline metal atoms contained in the positive electrode active material layer according to the previously described method for the above-mentioned positive electrode removed after disassembly are summarized in Table 3.

(Quantification of Lithium Compound in Positive Electrode)

The results of quantifying the lithium compound contained in the positive electrode active material layer according to the previously described method for the above-mentioned positive electrode removed after disassembly are summarized in Table 3.

Examples 2-31 and Comparative Examples 1-28

Lithium ion secondary batteries were fabricated and evaluated in the same manner as Example 1 with the exception of using the types of positive electrode precursors and negative electrodes, solvent composition in the non-aqueous electrolyte, $LiPO_2F_2$ concentration, environmental temperature during negative electrode pre-doping, and conditions of constant current charging and constant voltage charging respectively shown in Table 3.

The results are shown in Table 3.

TABLE 3

| | Electrode | | Negative | Electrode | Li Carbonate Capacity/ Irreversible Capacity Ratio |
|---|---|---|---|---|---|
| | Type of positive electrode precursor | Type of negative electrode | electrode irreversible capacity (mAh) | body Li carbonate capacity (mAh) | Li carbonate capacity/ irreversible capacity |
| Example 1 | Precursor 1 | Negative Electrode 1 | 247 | 283 | 1.15 |
| Example 2 | Precursor 1 | Negative Electrode 1 | 247 | 283 | 1.15 |
| Example 3 | Precursor 1 | Negative Electrode 1 | 247 | 283 | 1.15 |
| Example 4 | Precursor 1 | Negative Electrode 1 | 247 | 283 | 1.15 |
| Example 5 | Precursor 2 | Negative Electrode 1 | 247 | 281 | 1.14 |
| Example 6 | Precursor 3 | Negative Electrode 1 | 247 | 289 | 1.17 |
| Example 7 | Precursor 4 | Negative Electrode 1 | 247 | 278 | 1.13 |
| Example 8 | Precursor 5 | Negative Electrode 1 | 247 | 283 | 1.14 |
| Example 9 | Precursor 5 | Negative Electrode 1 | 247 | 283 | 1.14 |
| Example 10 | Precursor 5 | Negative Electrode 1 | 247 | 283 | 1.14 |
| Example 11 | Precursor 6 | Negative Electrode 1 | 247 | 440 | 1.78 |
| Example 12 | Precursor 7 | Negative Electrode 1 | 247 | 189 | 0.76 |
| Example 13 | Precursor 8 | Negative Electrode 1 | 247 | 141 | 0.57 |
| Example 14 | Precursor 8 | Negative Electrode 1 | 247 | 141 | 0.57 |
| Example 15 | Precursor 8 | Negative Electrode 1 | 247 | 141 | 0.57 |
| Example 16 | Precursor 1 | Negative Electrode 1 | 247 | 283 | 1.14 |
| Example 17 | Precursor 1 | Negative Electrode 1 | 247 | 283 | 1.14 |
| Example 18 | Precursor 1 | Negative Electrode 1 | 247 | 283 | 1.14 |
| Example 19 | Precursor 1 | Negative Electrode 1 | 247 | 283 | 1.14 |
| Example 20 | Precursor 9 | Negative Electrode 1 | 247 | 285 | 1.15 |
| Comp. Ex. 1 | Precursor 10 | Negative Electrode 1 | 247 | 424 | 1.72 |
| Comp. Ex. 2 | Precursor 10 | Negative Electrode 1 | 247 | 424 | 1.72 |
| Comp. Ex. 3 | Precursor 11 | Negative Electrode 1 | 247 | 148 | 0.60 |
| Comp. Ex. 4 | Precursor 11 | Negative Electrode 1 | 247 | 148 | 0.60 |
| Comp. Ex. 5 | Precursor 12 | Negative Electrode 1 | 247 | 165 | 0.67 |
| Comp. Ex. 6 | Precursor 12 | Negative Electrode 1 | 247 | 165 | 0.67 |
| Comp. Ex. 7 | Precursor 13 | Negative Electrode 1 | 247 | 22 | 0.09 |
| Comp. Ex. 8 | Precursor 13 | Negative Electrode 1 | 247 | 22 | 0.09 |
| Comp. Ex. 9 | Precursor 14 | Negative Electrode 1 | 247 | 754 | 3.05 |
| Comp. Ex. 10 | Precursor 14 | Negative Electrode 1 | 247 | 754 | 3.05 |
| Comp. Ex. 11 | Precursor 15 | Negative Electrode 1 | 247 | 283 | 1.14 |
| Comp. Ex. 12 | Precursor 15 | Negative Electrode 1 | 247 | 283 | 1.14 |
| Example 21 | Precursor 16 | Negative Electrode 2 | 433 | 526 | 1.21 |
| Example 22 | Precursor 16 | Negative Electrode 2 | 433 | 526 | 1.21 |
| Comp Ex. 13 | Precursor 17 | Negative Electrode 2 | 433 | 0 | 0.00 |
| Comp. Ex. 14 | Precursor 17 | Negative Electrode 2 | 433 | 0 | 0.00 |
| Example 23 | Precursor 18 | Negative Electrode 3 | 575 | 761 | 1.32 |
| Example 24 | Precursor 18 | Negative Electrode 3 | 575 | 761 | 1.32 |

TABLE 3-continued

| | | | | | |
|---|---|---|---|---|---|
| Comp. Ex. 15 | Precursor 19 | Negative Electrode 3 | 575 | 0 | 0.00 |
| Comp. Ex. 16 | Precursor 19 | Negative Electrode 3 | 575 | 0 | 0.00 |
| Comp. Ex. 17 | Precursor 20 | Negative Electrode 4 | 742 | 937 | 1.26 |
| Comp. Ex. 18 | Precursor 20 | Negative Electrode 4 | 742 | 937 | 1.26 |
| Example 25 | Precursor 21 | Negative Electrode 5 | 93 | 131 | 1.41 |
| Example 26 | Precursor 21 | Negative Electrode 5 | 93 | 131 | 1.41 |
| Comp. Ex. 19 | Precursor 22 | Negative Electrode 5 | 93 | 0 | 0.00 |
| Comp. Ex. 20 | Precursor 22 | Negative Electrode 5 | 93 | 0 | 0.00 |
| Comp. Ex. 21 | Precursor 21 | Negative Electrode 6 | 30 | 131 | 4.35 |
| Comp. Ex. 22 | Precursor 21 | Negative Electrode 6 | 30 | 131 | 4.35 |
| Comp. Ex. 23 | Precursor 22 | Negative Electrode 6 | 30 | 0 | 0.00 |
| Comp. Ex. 24 | Precursor 22 | Negative Electrode 6 | 30 | 0 | 0.00 |
| Example 27 | Precursor 1 | Negative Electrode 7 | 297 | 283 | 0.95 |
| Comp. Ex. 25 | Precursor 18 | Negative Electrode 8 | 645 | 761 | 1.18 |
| Comp. Ex. 26 | Precursor 18 | Negative Electrode 8 | 645 | 761 | 1.18 |
| Example 28 | Precursor 6 | Negative Electrode 9 | 246 | 440 | 1.79 |
| Example 29 | Precursor 6 | Negative Electrode 10 | 580 | 440 | 0.76 |
| Comp. Ex. 27 | Precursor 6 | Negative Electrode 11 | 655 | 440 | 0.67 |
| Example 30 | Precursor 6 | Negative Electrode 12 | 250 | 440 | 1.76 |
| Example 31 | Precursor 6 | Negative Electrode 13 | 576 | 440 | 0.76 |
| Comp. Ex. 28 | Precursor 6 | Negative Electrode 14 | 656 | 440 | 0.67 |

| | Nonaqueous Electrolyte | | | | |
|---|---|---|---|---|---|
| | Organic solvent | | | Lithium salt | |
| | EC volume ratio | EMC volume Ratio | DMC volume ratio | LiPF6 concentration (mol/L) | LiPO2F2 concentration (wt %) |
| Example 1 | 33 | 67 | 0 | 1.2 | 0.01 |
| Example 2 | 33 | 67 | 0 | 1.2 | 0.01 |
| Example 3 | 33 | 67 | 0 | 1.2 | 0.01 |
| Example 4 | 33 | 67 | 0 | 1.2 | 0.01 |
| Example 5 | 33 | 67 | 0 | 1.2 | 0.01 |
| Example 6 | 33 | 67 | 0 | 1.2 | 0.01 |
| Example 7 | 33 | 67 | 0 | 1.2 | 0.01 |
| Example 8 | 33 | 67 | 0 | 1.2 | 0.01 |
| Example 9 | 33 | 67 | 0 | 1.2 | 0.01 |
| Example 10 | 33 | 67 | 0 | 1.2 | 0.01 |
| Example 11 | 33 | 67 | 0 | 1.2 | 0.01 |
| Example 12 | 33 | 67 | 0 | 1.2 | 0.01 |
| Example 13 | 33 | 67 | 0 | 1.2 | 0.01 |
| Example 14 | 33 | 67 | 0 | 1.2 | 0.01 |
| Example 15 | 33 | 67 | 0 | 1.2 | 0.01 |
| Example 16 | 33 | 0 | 67 | 1.2 | 0.002 |
| Example 17 | 33 | 0 | 67 | 1.2 | 0.10 |
| Example 18 | 33 | 0 | 67 | 1.2 | 4.00 |
| Example 19 | 33 | 0 | 67 | 1.2 | 4.50 |
| Example 20 | 33 | 67 | 0 | 1.2 | 0.01 |
| Comp. Ex. 1 | 33 | 67 | 0 | 1.2 | 0.01 |
| Comp. Ex. 2 | 33 | 67 | 0 | 1.2 | 0.01 |
| Comp. Ex. 3 | 33 | 67 | 0 | 1.2 | 0.01 |
| Comp. Ex. 4 | 33 | 67 | 0 | 1.2 | 0.01 |
| Comp. Ex. 5 | 33 | 0 | 67 | 1.2 | 5.50 |
| Comp. Ex. 6 | 33 | 0 | 67 | 1.2 | 5.50 |
| Comp. Ex. 7 | 33 | 0 | 67 | 1.2 | 6.00 |
| Comp. Ex. 8 | 33 | 0 | 67 | 1.2 | 6.00 |
| Comp. Ex. 9 | 33 | 67 | 0 | 1.2 | — |
| Comp. Ex. 10 | 33 | 67 | 0 | 1.2 | — |
| Comp. Ex. 11 | 33 | 67 | 0 | 1.2 | — |
| Comp. Ex. 12 | 33 | 67 | 0 | 1.2 | — |
| Example 21 | 33 | 67 | 0 | 1.2 | 0.01 |
| Example 22 | 33 | 67 | 0 | 1.2 | 0.01 |
| Comp Ex. 13 | 33 | 67 | 0 | 1.2 | 0.01 |
| Comp. Ex. 14 | 33 | 67 | 0 | 1.2 | 0.01 |
| Example 23 | 33 | 67 | 0 | 1.2 | 0.01 |
| Example 24 | 33 | 67 | 0 | 1.2 | 0.01 |
| Comp. Ex. 15 | 33 | 67 | 0 | 1.2 | 0.01 |
| Comp. Ex. 16 | 33 | 67 | 0 | 1.2 | 0.01 |
| Comp. Ex. 17 | 33 | 67 | 0 | 1.2 | 0.01 |
| Comp. Ex. 18 | 33 | 67 | 0 | 1.2 | 0.01 |
| Example 25 | 33 | 67 | 0 | 1.2 | 0.01 |
| Example 26 | 33 | 67 | 0 | 1.2 | 0.01 |
| Comp. Ex. 19 | 33 | 67 | 0 | 1.2 | 0.01 |
| Comp. Ex. 20 | 33 | 67 | 0 | 1.2 | 0.01 |
| Comp. Ex. 21 | 33 | 67 | 0 | 1.2 | 0.01 |
| Comp. Ex. 22 | 33 | 67 | 0 | 1.2 | 0.01 |

TABLE 3-continued

| | | | | | |
|---|---|---|---|---|---|
| Comp. Ex. 23 | 33 | 67 | 0 | 1.2 | 0.01 |
| Comp. Ex. 24 | 33 | 67 | 0 | 1.2 | 0.01 |
| Example 27 | 33 | 67 | 0 | 1.2 | 0.01 |
| Comp. Ex. 25 | 33 | 67 | 0 | 1.2 | 0.01 |
| Comp. Ex. 26 | 33 | 67 | 0 | 1.2 | 0.01 |
| Example 28 | 33 | 0 | 67 | 1.2 | 0.01 |
| Example 29 | 33 | 0 | 67 | 1.2 | 0.01 |
| Comp. Ex. 27 | 33 | 0 | 67 | 1.2 | 0.01 |
| Example 30 | 33 | 0 | 67 | 1.2 | 0.01 |
| Example 31 | 33 | 0 | 67 | 1.2 | 0.01 |
| Comp. Ex. 28 | 33 | 0 | 67 | 1.2 | 0.01 |

| | Pre-doping Conditions | | | | Positive Electrode Active Material Layer |
|---|---|---|---|---|---|
| | | Constant current charging | | Constant voltage charging | |
| | Temperature (° C.) | Current value | Final voltage | Voltage value | Final current value | Peel strength (N/cm) |
| Example 1 | 45 | 0.2 A | 4.5 V | 4.5 V | ≤0.01 A | 0.19 |
| Example 2 | 60 | 0.2 A | 4.5 V | 4.5 V | ≤0.05 A | 0.15 |
| Example 3 | 35 | 0.2 A | 4.6 V | 4.6 V | ≤0.01 A | 0.21 |
| Example 4 | 25 | 0.2 A | 4.7 V | 4.7 V | ≤0.01 A | 0.23 |
| Example 5 | 45 | 0.2 A | 4.5 V | 4.5 V | ≤0.01 A | 0.22 |
| Example 6 | 45 | 0.2 A | 4.5 V | 4.5 V | ≤0.01 A | 1.71 |
| Example 7 | 45 | 0.2 A | 4.5 V | 4.5 V | ≤0.01 A | 0.02 |
| Example 8 | 45 | 0.2 A | 4.5 V | 4.5 V | ≤0.01 A | 0.02 |
| Example 9 | 60 | 0.2 A | 4.5 V | 4.5 V | ≤0.05 A | 0.01 |
| Example 10 | 25 | 0.2 A | 4.7 V | 4.7 V | ≤0.01 A | 0.03 |
| Example 11 | 45 | 0.2 A | 4.5 V | 4.5 V | ≤0.01 A | 0.19 |
| Example 12 | 35 | 0.2 A | 4.6 V | 4.6 V | ≤0.01 A | 0.22 |
| Example 13 | 60 | 0.2 A | 4.5 V | 4.5 V | ≤0.05 A | 1.88 |
| Example 14 | 35 | 0.2 A | 4.6 V | 4.6 V | ≤0.01 A | 1.79 |
| Example 15 | 25 | 0.2 A | 4.7 V | 4.7 V | ≤0.01 A | 1.92 |
| Example 16 | 45 | 0.2 A | 4.5 V | 4.5 V | ≤0.01 A | 0.18 |
| Example 17 | 45 | 0.2 A | 4.5 V | 4.5 V | ≤0.01 A | 0.19 |
| Example 18 | 45 | 0.2 A | 4.5 V | 4.5 V | ≤0.01 A | 0.18 |
| Example 19 | 45 | 0.2 A | 4.5 V | 4.5 V | ≤0.01 A | 0.19 |
| Example 20 | 60 | 0.2 A | 4.5 V | 4.5 V | ≤0.05 A | 0.17 |
| Comp. Ex. 1 | 70 | 0.2 A | 4.5 V | 4.5 V | ≤0.01 A | 0.0005 |
| Comp. Ex. 2 | 80 | 0.2 A | 4.5 V | 4.5 V | ≤0.01 A | 0.0003 |
| Comp. Ex. 3 | 70 | 0.2 A | 4.5 V | 4.5 V | ≤0.01 A | 0.0004 |
| Comp. Ex. 4 | 80 | 0.2 A | 4.5 V | 4.5 V | ≤0.01 A | 0.0002 |
| Comp. Ex. 5 | 45 | 0.2 A | 4.5 V | 4.5 V | ≤0.01 A | 0.18 |
| Comp. Ex. 6 | 0 | 0.2 A | 4.5 V | 4.5 V | ≤0.01 A | 0.19 |
| Comp. Ex. 7 | 45 | 0.2 A | 4.5 V | 4.5 V | ≤0.01 A | 0.17 |
| Comp. Ex. 8 | 0 | 0.2 A | 4.5 V | 4.5 V | ≤0.01 A | 0.18 |
| Comp. Ex. 9 | 25 | 0.2 A | 4.5 V | 4.5 V | ≤0.01 A | 0.16 |
| Comp. Ex. 10 | 35 | 0.2 A | 4.5 V | 4.5 V | ≤0.01 A | 0.18 |
| Comp. Ex. 11 | 25 | 0.2 A | 4.5 V | 4.5 V | ≤0.01 A | 2.21 |
| Comp. Ex. 12 | 35 | 0.2 A | 4.5 V | 4.5 V | ≤0.01 A | 2.17 |
| Example 21 | 35 | 0.2 A | 4.6 V | 4.6 V | ≤0.01 A | 0.17 |
| Example 22 | 25 | 0.2 A | 4.7 V | 4.7 V | ≤0.01 A | 0.18 |
| Comp. Ex. 13 | 35 | 0.2 A | 4.6 V | 4.6 V | ≤0.01 A | 0.19 |
| Comp. Ex. 14 | 25 | 0.2 A | 4.7 V | 4.7 V | ≤0.01 A | 0.18 |
| Example 23 | 35 | 0.2 A | 4.6 V | 4.6 V | ≤0.01 A | 0.20 |
| Example 24 | 25 | 0.2 A | 4.7 V | 4.7 V | ≤0.01 A | 0.18 |
| Comp. Ex. 15 | 35 | 0.2 A | 4.6 V | 4.6 V | ≤0.01 A | 0.22 |
| Comp. Ex. 16 | 25 | 0.2 A | 4.7 V | 4.7 V | ≤0.01 A | 0.18 |
| Comp. Ex. 17 | 35 | 0.2 A | 4.6 V | 4.6 V | ≤0.01 A | 0.18 |
| Comp. Ex. vl8 | 25 | 0.2 A | 4.7 V | 4.7 V | ≤0.01 A | 0.20 |
| Example 25 | 35 | 0.2 A | 4.6 V | 4.6 V | ≤0.01 A | 0.23 |
| Example 26 | 25 | 0.2 A | 4.7 V | 4.7 V | ≤0.01 A | 0.21 |
| Comp. Ex. 19 | 35 | 0.2 A | 4.6 V | 4.6 V | ≤0.01 A | 0.24 |
| Comp. Ex. 20 | 25 | 0.2 A | 4.7 V | 4.7 V | ≤0.01 A | 0.25 |
| Comp. Ex. 21 | 35 | 0.2 A | 4.6 V | 4.6 V | ≤0.01 A | 0.23 |
| Comp. Ex. 22 | 25 | 0.2 A | 4.7 V | 4.7 V | ≤0.01 A | 0.22 |
| Comp. Ex. 23 | 35 | 0.2 A | 4.6 V | 4.6 V | ≤0.01 A | 0.22 |
| Comp. Ex. 24 | 25 | 0.2 A | 4.7 V | 4.7 V | ≤0.01 A | 0.20 |
| Example 27 | 45 | 0.2 A | 4.5 V | 4.5 V | ≤0.01 A | 0.2 |
| Comp. Ex. 25 | 35 | 0.2 A | 4.6 V | 4.6 V | ≤0.01 A | 0.18 |
| Comp. Ex. 26 | 25 | 0.2 A | 4.7 V | 4.7 V | ≤0.01 A | 0.16 |

TABLE 3-continued

| | | | | | | |
|---|---|---|---|---|---|---|
| Example 28 | 35 | 0.2 A | 4.6 V | 4.6 V | ≤0.01 A | 0.18 |
| Example 29 | 35 | 0.2 A | 4.6 V | 4.6 V | ≤0.01 A | 0.19 |
| Comp. Ex. 27 | 35 | 0.2 A | 4.6 V | 4.6 V | ≤0.01 A | 0.17 |
| Example 30 | 35 | 0.2 A | 4.6 V | 4.6 V | ≤0.01 A | 0.19 |
| Example 31 | 35 | 0.2 A | 4.6 V | 4.6 V | ≤0.01 A | 0.19 |
| Comp. Ex. 28 | 25 | 0.2 A | 4.7 V | 4.7 V | ≤0.01 A | 0.18 |

| | Positive Electrode Active Material Layer | | | | |
|---|---|---|---|---|---|
| | Li compound other than active material (wt %) | Alkaline metal atom concentration (ppm) | Amount of compounds of (1)-(3) (mol/g) | Ni3p energy difference (eV) | F atom relative concentration (atomic %) |
| Example 1 | 1.2 | 47 | $5.2 \times 10^{-5}$ | 5.5 | 17.7 |
| Example 2 | 0.2 | 41 | $2.4 \times 10^{-3}$ | 5.8 | 24.0 |
| Example 3 | 2.3 | 44 | $6.1 \times 10^{-7}$ | 5.2 | 13.0 |
| Example 4 | 3.5 | 50 | $8.2 \times 10^{-9}$ | 5.0 | 8.8 |
| Example 5 | 1.5 | 6 | $7.6 \times 10^{-5}$ | 5.4 | 16.7 |
| Example 6 | 1.1 | 2 | $3.6 \times 10^{-5}$ | 5.1 | 10.3 |
| Example 7 | 1.8 | 1 | $4.4 \times 10^{-5}$ | 4.9 | 7.3 |
| Example 8 | 0.8 | 431 | $6.1 \times 10^{-5}$ | 6.0 | 26.6 |
| Example 9 | 0.3 | 411 | $2.3 \times 10^{-2}$ | 6.1 | 27.0 |
| Example 10 | 4.4 | 468 | $2.3 \times 10^{-8}$ | 5.9 | 25.0 |
| Example 11 | 1.0 | 10 | $9.1 \times 10^{-4}$ | 5.3 | 14.5 |
| Example 12 | 1.1 | 9 | $6.1 \times 10^{-9}$ | 4.9 | 7.5 |
| Example 13 | 1.2 | 10 | $6.5 \times 10^{-3}$ | 5.8 | 24.8 |
| Example 14 | 1.0 | 7 | $5.0 \times 10^{-6}$ | 5.3 | 14.0 |
| Example 15 | 2.2 | 11 | $8.0 \times 10^{-9}$ | 4.9 | 7.7 |
| Example 16 | 1.3 | 46 | $3.4 \times 10^{-5}$ | 5.4 | 15.4 |
| Example 17 | 1.5 | 48 | $5.8 \times 10^{-5}$ | 5.5 | 17.3 |
| Example 18 | 1.2 | 47 | $3.0 \times 10^{-5}$ | 5.4 | 16.0 |
| Example 19 | 1.1 | 45 | $6.8 \times 10^{-5}$ | 5.5 | 18.9 |
| Example 20 | 1.1 | 48 | $4.0 \times 10^{-5}$ | 5.7 | 23.3 |
| Comp. Ex. 1 | 1.2 | 46 | $3.8 \times 10^{-2}$ | 6.3 | 31.2 |
| Comp. Ex. 2 | 0.4 | 43 | $5.5 \times 10^{-2}$ | 6.4 | 32.2 |
| Comp. Ex. 3 | 0.0 | 44 | $4.0 \times 10^{-2}$ | 6.3 | 30.8 |
| Comp. Ex. 4 | 0.0 | 40 | $7.0 \times 10^{-2}$ | 6.3 | 30.5 |
| Comp. Ex. 5 | 0.0 | 0 | $4.9 \times 10^{-2}$ | 6.4 | 32.9 |
| Comp. Ex. 6 | 3.3 | 0 | $1.2 \times 10^{-9}$ | 4.7 | 4.3 |
| Comp. Ex. 7 | 0.0 | 0 | $7.3 \times 10^{-5}$ | 6.4 | 31.0 |
| Comp. Ex. 8 | 0.3 | 0 | $1.0 \times 10^{-9}$ | 4.6 | 3.3 |
| Comp. Ex. 9 | 12.1 | 650 | $5.6 \times 10^{-2}$ | 6.4 | 32.9 |
| Comp. Ex. 10 | 10.5 | 621 | $8.6 \times 10^{-2}$ | 6.3 | 29.7 |
| Comp. Ex. 11 | 2.3 | 767 | $6.1 \times 10^{-7}$ | 4.7 | 4.8 |
| Comp. Ex. 12 | 1.1 | 745 | $3.1 \times 10^{-6}$ | 4.8 | 6.2 |
| Example 21 | 1.7 | 267 | $2.9 \times 10^{-5}$ | 5.3 | 14.4 |
| Example 22 | 2.1 | 289 | $5.5 \times 10^{-7}$ | 5.6 | 20.2 |
| Comp. Ex. 13 | 0.0 | 0 | 0 | 4.7 | 4.8 |
| Comp. Ex. 14 | 0.0 | 0 | 0 | 4.8 | 5.5 |
| Example 23 | 5.5 | 4 | $9.1 \times 10^{-5}$ | 5.5 | 20.1 |
| Example 24 | 8.7 | 3 | $7.0 \times 10^{-7}$ | 5.2 | 10.6 |
| Comp. Ex. 15 | 0.0 | 0 | 0 | 4.7 | 4.5 |
| Comp. Ex. 16 | 0.0 | 0 | 0 | 4.7 | 5.4 |
| Comp. Ex. 17 | 10.2 | 5 | $1.1 \times 10^{-4}$ | 6.3 | 30.0 |
| Comp. Ex. v18 | 11.1 | 4 | $1.3 \times 10^{-6}$ | 6.2 | 28.9 |
| Example 25 | 0.1 | 4 | $4.1 \times 10^{-7}$ | 5.6 | 20.9 |
| Example 26 | 0.2 | 2 | $6.5 \times 10^{-9}$ | 5.3 | 12.1 |
| Comp. Ex. 19 | 0.0 | 0 | 0 | 4.8 | 6.8 |
| Comp. Ex. 20 | 0.0 | 0 | 0 | 4.7 | 4.7 |
| Comp. Ex. 21 | 0.3 | 5 | $6.5 \times 10^{-7}$ | 4.7 | 4.3 |
| Comp. Ex. 22 | 0.2 | 3 | $6.0 \times 10^{-9}$ | 4.8 | 5.8 |
| Comp. Ex. 23 | 0.0 | 0 | 0 | 4.7 | 3.6 |
| Comp. Ex. 24 | 0.0 | 0 | 0 | 4.6 | 2.5 |
| Example 27 | 1.1 | 44 | $4.3 \times 10^{-5}$ | 5.5 | 17.4 |
| Comp. Ex. 25 | 5.8 | 5 | $4.9 \times 10^{-5}$ | 5.6 | 20.7 |
| Comp. Ex. 26 | 8.2 | 3 | $6.3 \times 10^{-7}$ | 5.3 | 12.0 |
| Example 28 | 4.6 | 9 | $2.3 \times 10^{-5}$ | 5.6 | 20.8 |
| Example 29 | 3.2 | 6 | $5.9 \times 10^{-5}$ | 5.5 | 18.9 |
| Comp. Ex. 27 | 3.7 | 7 | $3.3 \times 10^{-5}$ | 5.6 | 21.1 |
| Example 30 | 4.9 | 9 | $4.0 \times 10^{-5}$ | 5.4 | 15.3 |
| Example 31 | 3.0 | 7 | $3.9 \times 10^{-5}$ | 5.5 | 19.5 |
| Comp. Ex. 28 | 4.8 | 5 | $6.3 \times 10^{-5}$ | 5.6 | 20.3 |

TABLE 3-continued

| | Negative Electrode | | | Lithium Ion Secondary Battery | | | | | | |
|---|---|---|---|---|---|---|---|---|---|---|
| | Negative electrode potential (V) | Li metal relative concentration (atomic %) | F atom relative concentration (atomic %) | Short circuit rate | Discharge capacity (Wh) | Energy density (Wh/L) | Internal resistance Ra(mΩ) | Internal resistance Rb (mΩ) | Rb/Ra | Capacity maintenance rate |
| Example 1 | 0.52 | 12.4 | 33.2 | 0% | 3.62 | 616 | 23.2 | 28.3 | 1.22 | 85% |
| Example 2 | 0.48 | 17.2 | 42.3 | 0% | 3.56 | 606 | 24.4 | 28.2 | 1.16 | 87% |
| Example 3 | 0.55 | 9.6 | 20.1 | 0% | 3.64 | 620 | 23.6 | 28.5 | 1.21 | 83% |
| Example 4 | 0.51 | 6.5 | 10.2 | 0% | 3.66 | 623 | 23.1 | 29.1 | 1.26 | 83% |
| Example 5 | 0.77 | 11.4 | 29.4 | 0% | 3.55 | 610 | 24.1 | 27.5 | 1.14 | 90% |
| Example 6 | 0.85 | 11.5 | 14.5 | 0% | 3.61 | 599 | 25.4 | 29.5 | 1.16 | 91% |
| Example 7 | 0.88 | 13.1 | 7.7 | 10% | 3.64 | 661 | 22.3 | 27.0 | 1.21 | 87% |
| Example 8 | 0.93 | 10.4 | 45.4 | 10% | 3.70 | 678 | 22.5 | 27.2 | 1.21 | 88% |
| Example 9 | 0.75 | 18.0 | 46.4 | 10% | 3.62 | 663 | 23.6 | 27.8 | 1.18 | 89% |
| Example 10 | 0.86 | 5.7 | 42.5 | 0% | 3.78 | 692 | 22.1 | 26.9 | 1.22 | 85% |
| Example 11 | 0.36 | 23.6 | 24.3 | 10% | 3.70 | 604 | 24.4 | 29.3 | 1.20 | 91% |
| Example 12 | 1.01 | 3.2 | 8.9 | 0% | 3.50 | 623 | 24.6 | 30.2 | 1.23 | 86% |
| Example 13 | 1.15 | 5.4 | 43.2 | 0% | 3.46 | 610 | 25.5 | 31.1 | 1.22 | 87% |
| Example 14 | 1.16 | 2.3 | 24.0 | 0% | 3.34 | 589 | 26.1 | 32.0 | 1.23 | 88% |
| Example 15 | 1.01 | 1.3 | 8.3 | 0% | 3.42 | 603 | 25.3 | 31.8 | 1.26 | 85% |
| Example 16 | 0.51 | 11.5 | 26.8 | 0% | 3.54 | 602 | 21.4 | 26.4 | 1.23 | 85% |
| Example 17 | 0.44 | 11.1 | 33.4 | 10% | 3.64 | 619 | 24.3 | 30.3 | 1.25 | 84% |
| Example 18 | 0.4 | 13.1 | 27.0 | 0% | 3.65 | 622 | 25.2 | 32.2 | 1.28 | 83% |
| Example 19 | 0.37 | 12.0 | 35.4 | 0% | 3.67 | 626 | 25.8 | 34.0 | 1.32 | 82% |
| Example 20 | 0.55 | 15.3 | 40.2 | 0% | 3.64 | 637 | 25.8 | 34.0 | 1.32 | 82% |
| Comp. Ex. 1 | 0.79 | 26.2 | 52.3 | 40% | 3.38 | 576 | 27.2 | 37.0 | 1.36 | 78% |
| Comp. Ex. 2 | 1.04 | 27.3 | 54.3 | 50% | 3.18 | 542 | 28.9 | 40.1 | 1.39 | 74% |
| Comp. Ex. 3 | 1.24 | 26.1 | 50.8 | 50% | 2.96 | 504 | 28.1 | 39.3 | 1.40 | 71% |
| Comp. Ex. 4 | 1.41 | 25.7 | 49.7 | 60% | 2.70 | 460 | 29.0 | 41.2 | 1.42 | 68% |
| Comp. Ex. 5 | 1.3 | 0.7 | 55.9 | 0% | 2.90 | 494 | 27.8 | 37.1 | 1.33 | 73% |
| Comp. Ex. 6 | 1.38 | 0.5 | 2.3 | 10% | 2.82 | 481 | 27.7 | 38.8 | 1.40 | 75% |
| Comp. Ex. 7 | 1.35 | 0.4 | 52.0 | 0% | 2.70 | 460 | 28.9 | 40.2 | 1.39 | 69% |
| Comp. Ex. 8 | 1.39 | 0.7 | 2.0 | 0% | 2.74 | 467 | 28.6 | 41.2 | 1.44 | 71% |
| Comp. Ex. 9 | 0.28 | 26.5 | 54.4 | 0% | 3.19 | 456 | 30.2 | 43.3 | 1.43 | 76% |
| Comp. Ex. 10 | 0.26 | 27.1 | 48.9 | 0% | 3.23 | 461 | 31.2 | 43.7 | 1.40 | 75% |
| Comp. Ex. 11 | 0.67 | 0.6 | 4.5 | 0% | 3.41 | 505 | 29.1 | 42.3 | 1.45 | 72% |
| Comp. Ex. 12 | 0.59 | 0.3 | 5.6 | 0% | 3.44 | 510 | 28.6 | 41.3 | 1.44 | 68% |
| Example 21 | 0.47 | 10.3 | 23.0 | 0% | 3.89 | 656 | 24.2 | 28.9 | 1.19 | 87% |
| Example 22 | 0.58 | 13.2 | 37.8 | 0% | 3.84 | 649 | 24.1 | 28.4 | 1.18 | 87% |
| Comp. Ex. 13 | 1.35 | 0 | 3.0 | 0% | 3.14 | 555 | 25.1 | 35.8 | 1.43 | 75% |
| Comp. Ex. 14 | 1.45 | 0 | 4.3 | 10% | 3.10 | 547 | 24.8 | 37.1 | 1.50 | 73% |
| Example 23 | 0.89 | 14.2 | 34.0 | 0% | 3.78 | 633 | 25.3 | 31.5 | 1.25 | 84% |
| Example 24 | 0.97 | 8.9 | 16.1 | 0% | 3.82 | 640 | 25.6 | 31.9 | 1.25 | 85% |
| Comp. Ex. 15 | 1.56 | 0 | 4.1 | 0% | 2.82 | 503 | 26.7 | 41.2 | 1.54 | 67% |
| Comp. Ex. 16 | 1.55 | 0 | 5.2 | 0% | 2.78 | 495 | 27.1 | 42.4 | 1.56 | 66% |
| Comp. Ex. 17 | 1.34 | 26.8 | 48.9 | 0% | 3.69 | 601 | 27.8 | 38.8 | 1.40 | 75% |
| Comp. Ex. 18 | 1.33 | 26.6 | 47.4 | 0% | 3.73 | 608 | 28.2 | 39.1 | 1.39 | 73% |
| Example 25 | 0.55 | 15.3 | 35.6 | 0% | 3.53 | 601 | 23.5 | 27.8 | 1.18 | 85% |
| Example 26 | 0.45 | 10.2 | 16.0 | 0% | 3.49 | 594 | 23.1 | 28.0 | 1.21 | 86% |
| Comp. Ex. 19 | 0.98 | 0 | 6.7 | 10% | 3.22 | 558 | 24.3 | 31.3 | 1.29 | 77% |
| Comp. Ex. 20 | 0.99 | 0 | 3.2 | 0% | 3.18 | 552 | 24.1 | 32.0 | 1.33 | 76% |
| Comp. Ex. 21 | 0.23 | 27.8 | 1.6 | 0% | 3.41 | 502 | 24.1 | 30.7 | 1.27 | 80% |
| Comp. Ex. 22 | 0.25 | 28.2 | 4.3 | 0% | 3.38 | 497 | 24.0 | 31.0 | 1.29 | 81% |
| Comp. Ex. 23 | 0.59 | 0 | 1.0 | 0% | 3.41 | 509 | 24.5 | 32.2 | 1.31 | 77% |
| Comp. Ex. 24 | 0.65 | 0 | 0.8 | 0% | 3.44 | 514 | 25.1 | 33.3 | 1.33 | 75% |
| Example 27 | 0.66 | 10.9 | 31.8 | 0% | 3.59 | 623 | 23.0 | 28.1 | 1.22 | 84% |
| Comp. Ex. 25 | 1.12 | 13.2 | 36.7 | 0% | 3.51 | 580 | 26.5 | 34.5 | 1.30 | 77% |
| Comp. Ex. 26 | 1.25 | 8.6 | 16.0 | 0% | 3.48 | 577 | 27.0 | 35.5 | 1.31 | 78% |
| Example 28 | 0.56 | 19.7 | 37.6 | 0% | 3.71 | 610 | 25.5 | 32.2 | 1.26 | 85% |
| Example 29 | 0.88 | 20.1 | 38.7 | 0% | 3.72 | 632 | 25.4 | 32.8 | 1.29 | 83% |
| Comp. Ex. 27 | 1.21 | 23.5 | 41.1 | 0% | 3.41 | 561 | 25.8 | 36.1 | 1.40 | 75% |
| Example 30 | 0.55 | 18.9 | 32.5 | 0% | 3.73 | 612 | 25.0 | 32.0 | 1.28 | 84% |
| Example 31 | 0.86 | 20.1 | 35.0 | 0% | 3.70 | 630 | 25.2 | 32.0 | 1.27 | 83% |
| Comp. Ex. 28 | 1.25 | 22.1 | 39.7 | 0% | 3.40 | 560 | 25.6 | 35.4 | 1.38 | 76% |

In Table 3, the abbreviations for the names of organic solvents used in the column entitled "Nonaqueous Electrolyte" respectively have the meanings indicated below.

EC: Ethylene carbonate
EMC: Methyl ethyl carbonate
DMC: Dimethyl carbonate

According to Table 1, Table 2 and Table 3, in the case peel strength of the positive electrode precursor and positive electrode is 0.01 N/cm or more, the positive electrode active material layer is inhibited from sliding off due to $CO_2$ gas generated during pre-doping thereby making it possible to lower the short circuit rate, while in the case the peel strength is 2.00 N/cm or less, internal resistance is thought to be able to be lowered as a result of enhancing electron conductivity within the positive electrode active material layer.

In the case the concentration of LiPO$_2$F$_2$ is 0.001 wt % or more, deterioration of the positive electrode active material accompanying decomposition of the lithium compound during the pre-doping step is inhibited and energy density can be increased, while in the case that concentration is 5.00 wt % or less, internal resistance is thought to be able to be lowered as a result of enhancing the electrical conductivity of the electrolyte.

In the case the concentration of alkaline metal atoms contained in the positive electrode active material layer is 1 ppm or more, side reactions occurring during pre-doping can be inhibited and energy density can be increased, and if the concentration is 500 ppm or less, cycle characteristics improved.

Energy density was able to be enhanced by mixing the second negative electrode active material as a negative electrode active material at 5 wt % to 50 wt %, mixing a lithium compound other than the positive electrode active material into the positive electrode precursor, and making the ratio of lithium carbonate capacity to irreversible capacity to be 0.50 to 2.0.

Both improvement of charge/discharge cycle characteristics and inhibition of decreases in capacity and output are thought to be able to be realized by adjusting the voltage applied in the pre-doping step to a suitable range, reacting the lithium compound other than the positive electrode active material in the positive electrode active material layer with LiPF$_6$ in the electrolyte, reacting the fluorine ions generated with a lithium transition metal oxide containing Ni atoms, and suitably accumulating a passivation layer comprised of NiF$_2$ on the surface of the positive electrode active material layer.

INDUSTRIAL APPLICABILITY

The lithium ion secondary battery of the present invention is capable of composing, for example, a power storage module by connecting a plurality of lithium ion secondary batteries in series or in parallel.

The lithium ion secondary battery of the present invention and the above-mentioned power storage module can be preferably used in various power storage systems such as power regeneration systems of automobile hybrid drive systems requiring high-load charge/discharge cycle characteristics, power load leveling systems used in natural power generation and microgrids such as solar power generation or wind power generation, uninterruptable power supply systems used in factory production equipment, non-contact power supply systems used for the purpose of leveling voltage fluctuations such as electrolytic resonance and storing energy, electric vehicles, plug-in hybrid vehicles, electric motorcycles, in-wheel motor systems and power steering systems as vehicle power supplies, quick charge systems capable of charging at high currents in order to carry out short-term charging, and cell phones, smartphones and personal computers as mobile devices.

The invention claimed is:

1. A lithium ion secondary battery provided with a positive electrode, a negative electrode and a nonaqueous electrolyte containing lithium ions; wherein, the positive electrode has a positive electrode current collector and a positive electrode active material layer provided on one side or both sides of the positive electrode current collector, the positive electrode active material layer contains a positive electrode active material and a lithium compound other than the positive electrode active material, the positive electrode active material contains a transition metal oxide that is capable of occluding and releasing lithium ions and contains Ni atoms, the concentration of the lithium compound other than the positive electrode active material contained in the positive electrode active material layer based on the total weight of the positive electrode active material layer is 0.1 wt % to 10 wt %, the negative electrode has a negative electrode current collector and a negative electrode active material layer provided on one side or both sides of the negative electrode current collector, the negative electrode active material layer, based on the total weight of the negative electrode active material layer, contains a carbon material as a first negative electrode active material at a ratio of 50 wt % to 60 wt %, at least one type among SiO$_x$ (wherein, 0.01≤x≤2) and tin dioxide as a second negative electrode active material at a ratio 30 wt % to 50 wt %, a difference between energy of the Ni3p main peak and energy of the Ni3p sub-peak as measured by X-ray photoelectron spectroscopy (XPS) of the positive electrode active material layer when the voltage of the lithium ion secondary battery is 3.5 V, is 4.9 eV to 6.1 eV, a relative concentration of F atoms, as measured by X-ray photoelectron spectroscopy (XPS) of positive electrode active material layer when the voltage of the lithium ion secondary battery is 3.5 V, is 7.2 atomic % to 27.1 atomic % the relative concentration of Li atoms having a peak at 52.5 eV to 53.7 eV in the Li1s spectrum observed by X-ray photoelectron spectroscopy (XPS) of the negative electrode active material layer when the voltage of the lithium ion secondary battery is 3.5 V, is 1.0 atomic % to 25.0 atomic %, and the relative concentration of F atoms, as measured by X-ray photoelectron spectroscopy (XPS) of the negative electrode active material layer when the voltage of the lithium ion secondary battery is 3.5 V, is 7.5 atomic % to 46.5 atomic %.

2. The lithium ion secondary battery according to claim 1, wherein the first negative electrode active material contained in the negative electrode active material layer is graphite, and the concentration of the graphite contained in the negative electrode active material layer based on the total weight of the negative electrode active material layer is 55 wt % to 60 wt %.

3. The lithium ion secondary battery according to claim 1, wherein the positive electrode active material layer further contains at least one type of alkaline metal atoms selected from the group consisting of Na atoms and K atoms, and the concentration of alkaline metal atoms contained in the positive electrode active material layer based on the total weight of the positive electrode active material layer is 1 ppm to 500 ppm.

4. The lithium ion secondary battery according to claim 1, wherein the peel strength between the positive electrode active material layer and the positive electrode current collector is 0.01 N/cm to 2.00 N/cm, and the nonaqueous contains LiPO$_2$F$_2$ at a ratio of 0.001 wt % to 5.000 wt %.

5. The lithium ion secondary battery according to claim 1, wherein the transition metal oxide contains at least one type of compound selected from the group consisting of compounds respectively represented by the following formulas:

$$Li_xNi_aCo_bAl_{(1-a-b)}O_2$$

(wherein, x satisfies 0≤x≤1, a satisfies 0.05<a<0.97, and b satisfies 0.05<b<0.97), and $$Li_xNi_cCo_dMn_{(1-c-d)}O_2$$

(wherein, x satisfies 0≤x≤1, c satisfies 0.05<c<0.97, and d satisfies 0.05<d<0.97).

6. The lithium ion secondary battery according to claim 1, wherein the positive electrode active material layer contains at least one type of compound selected from the group consisting of compounds respectively represented by the following formulas (1) to (3) at a ratio of $3.8\times10^{-9}$ mol/g to $3.0\times10^{-2}$ mol/g per unit weight of the positive electrode active material layer:

$$LiX^1\text{—}OR^1O\text{—}X^2Li \qquad (1)$$

(wherein, $R^1$ represents an alkylene group having 1 to 4 carbon atoms or a halogenated alkylene group having 1 to 4 carbon atoms, and $X^1$ and $X^2$ respectively and independently represent a single bond or —(COO)—), $$LiX^1\text{—}OR^1O\text{—}X^2R^2 \qquad (2)$$

(wherein, $R^1$ represents an alkylene group having 1 to 4 carbon atoms or halogenated alkylene group having 1 to 4 carbon atoms, $R^2$ represents hydrogen, an alkyl group having 1 to 10 carbon atoms, a monohydroxyalkyl group having 1 to 10 carbon atoms, a polyhydroxyalkyl group having 1 to 10 carbon atoms, an alkenyl group having 2 to 10 carbon atoms, a monohydroxyalkenyl group having 2 to 10 carbon atoms, a polyhydroxyalkenyl group having 2 to 10 carbon atoms, a cycloalkyl group having 3 to 6 carbon atoms or an aryl group, and $X^1$ and $X^2$ respectively and independently represent a single bond or —(COO)—), and $$R^2X^1\text{—}OR^1O\text{—}X^2R^3 \qquad (3)$$

(wherein, $R^1$ represents an alkylene group having 1 to 4 carbon atoms or a halogenated alkylene group having 1 to 4 carbon atoms, $R^2$ and $R^3$ respectively and independently represent hydrogen, an alkyl group having 1 to 10 carbon atoms, a monohydroxyalkyl group having 1 to 10 carbon atoms, a polyhydroxyalkyl group having 1 to 10 carbon atoms, an alkenyl group having 2 to 10 carbon atoms, a monohydroxyalkenyl group having 2 to 10 carbon atoms, a polyhydroxyalkenyl group having 2 to 10 carbon atoms, a cycloalkyl group having 3 to 6 carbon atoms or an aryl group, and $X^1$ and $X^2$ respectively and independently represent a single bond or —(COO)—).

7. The lithium ion secondary battery according to claim 1, wherein the lithium compound other than the positive electrode active material is lithium carbonate.

8. The lithium ion secondary battery according to claim 1, wherein the concentration of water contained in the nonaqueous electrolyte is 1 ppm to 5,000 ppm.

9. The lithium ion secondary battery according to claim 1, containing one or more types of lithium salts selected from $LiPF_6$, $LiBF_4$, $LiN(SO_2F)_2$, $LiN(SO_2F)(SO_2CF_3)$, $LiN(SO_2CF_3)_2$ and $LiClO_4$ in the nonaqueous electrolyte.

10. The lithium ion secondary battery according to claim 1, containing one or more types of organic solvents selected from dimethyl carbonate, ethyl methyl carbonate and diethyl carbonate in the nonaqueous electrolyte.

11. The lithium ion secondary battery according to claim 1, wherein the negative electrode potential at a voltage of 2.5 V is 0.3 V to 1.2 V.

12. The lithium ion secondary battery according to claim 1, wherein volumetric energy density is 500 Wh/L to 1,500 Wh/L.

13. A power storage module, power regeneration system, power load leveling system, uninterruptable power supply system, non-contact power supply system, energy harvesting system, natural energy storage system, electric power steering system, emergency power supply system, in-wheel motor system, idle reduction system, electric vehicle, plug-in hybrid vehicle, electric motorcycle, quick charge system, cell phone, smartphone, personal computer or power storage system using the lithium ion secondary battery described in claim 1.

* * * * *